(12) United States Patent
Perez et al.

(10) Patent No.: US 9,847,905 B2
(45) Date of Patent: Dec. 19, 2017

(54) SYSTEM AND METHOD FOR IDENTITY MANAGEMENT PROVIDERS IN A CLOUD PLATFORM ENVIRONMENT

(71) Applicant: ORACLE INTERNATIONAL CORPORATION, Redwood Shores, CA (US)

(72) Inventors: Craig Perez, Nashua, NH (US); Bhavanishankara Sapaliga, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 219 days.

(21) Appl. No.: 14/478,987

(22) Filed: Sep. 5, 2014

(65) Prior Publication Data

US 2015/0121483 A1   Apr. 30, 2015

Related U.S. Application Data

(60) Provisional application No. 61/897,699, filed on Oct. 30, 2013.

(51) Int. Cl.
*H04L 29/06* (2006.01)
*H04L 12/24* (2006.01)
*H04L 29/08* (2006.01)

(52) U.S. Cl.
CPC .......... *H04L 41/0806* (2013.01); *H04L 41/50* (2013.01); *H04L 41/5041* (2013.01); *H04L 63/08* (2013.01); *H04L 63/0823* (2013.01); *H04L 67/10* (2013.01); *H04L 63/168* (2013.01)

(58) Field of Classification Search
CPC . H04L 41/5041; H04L 41/0806; H04L 41/50; H04L 67/10; H04L 63/0823; H04L 63/168; H04L 63/08
See application file for complete search history.

(56) References Cited

U.S. PATENT DOCUMENTS

2007/0245013 A1* 10/2007 Saraswathy ........... G06F 21/604
                                                        709/223
2011/0321033 A1   12/2011 Kelkar
2012/0173725 A1*  7/2012 Verma .................. G06F 9/5027
                                                        709/225

(Continued)

OTHER PUBLICATIONS

United States Patent and Trademark Office, Office Action dated April 11, 2016 for U.S. Appl. No. 14/476,587, 10 Pages.

*Primary Examiner* — Tri Tran
(74) *Attorney, Agent, or Firm* — Tucker Ellis LLP

(57) ABSTRACT

Described herein is a system and method for supporting an identity management provider in a cloud computing environment. In accordance with an embodiment, an identity management (IDM) provider can provide an identity store (e.g., LDAP directory) configuration for use by a cloud platform (e.g., CloudLogic) service. In accordance with an embodiment, the IDM provider can centrally manage one or more identity store configurations, and supply a particular configuration to the orchestration engine when a service is being provisioned, so that the service can then be launched with an appropriate identity store. This allows a platform administrator to specify identity store configurations once and in one place, instead of having to create an identity store configuration for each service.

20 Claims, 19 Drawing Sheets

(56) References Cited

U.S. PATENT DOCUMENTS

| | | | |
|---|---|---|---|
| 2012/0185913 A1* | 7/2012 | Martinez | G06F 9/455 726/1 |
| 2013/0111467 A1 | 5/2013 | Sundararaj | |
| 2014/0098813 A1 | 4/2014 | Mishra | |
| 2014/0115655 A1 | 4/2014 | Marvais | |

* cited by examiner

SYSTEM AND METHOD FOR IDENTITY MANAGEMENT PROVIDERS IN A CLOUD PLATFORM ENVIRONMENT

CLAIM OF PRIORITY

This application claims the benefit of priority to U.S. Provisional Application titled "SYSTEM AND METHOD FOR IDENTITY MANAGEMENT AND WEBTIER PROVIDERS IN A CLOUD PLATFORM ENVIRONMENT", Application No. 61/897,699, filed Oct. 30, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing, and in particular to systems and methods for providing functionalities such as identity management and webtier providers in a cloud platform environment.

BACKGROUND

The term "cloud computing" is generally used to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. Generally, a cloud computing model enables some of those responsibilities which previously may have been provided by an organization's own information technology department, to instead be delivered as service layers within a cloud environment, for use by consumers (either within or external to the organization, according to the cloud's public/private nature).

As an illustrative example, a cloud computing model can be implemented as Platform as a Service (PaaS), in which consumers can use software programming languages and development tools supported by a PaaS provider to develop, deploy, and otherwise control their own applications, while providers manage or control other aspects of the cloud environment (i.e., everything below the run-time execution environment). In addition, the providers can provide support to satisfy a service's infrastructural requirements. These are the general areas that embodiments of the invention are intended to address.

SUMMARY

Described herein is a system and method for supporting an identity management provider in a cloud computing environment. In accordance with an embodiment, an identity management (IDM) provider can provide an identity store (e.g., LDAP directory) configuration for use by a cloud platform (e.g., CloudLogic) service. In accordance with an embodiment, the IDM provider can centrally manage one or more identity store configurations, and supply a particular configuration to the orchestration engine when a service is being provisioned, so that the service can then be launched with an appropriate identity store. This allows a platform administrator to specify identity store configurations once and in one place, instead of having to create an identity store configuration for each service.

DETAILED DESCRIPTION

In accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization. Described herein are a variety of hardware and/or software components and features, which can be used in delivering an infrastructure, platform, and/or applications to support cloud computing.

Figure 1:
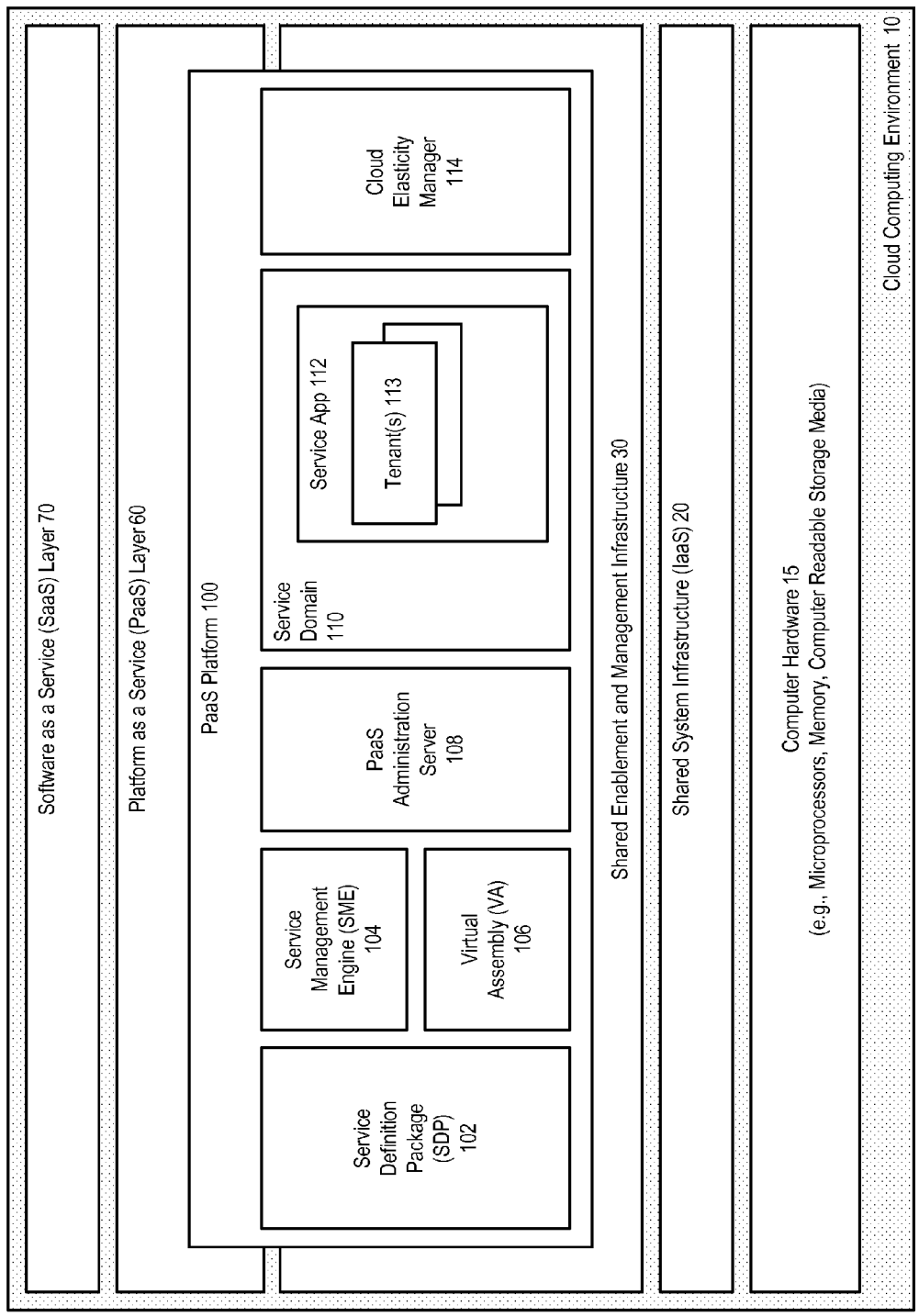
FIG. 1 illustrates an example of a cloud computing environment, in accordance with an embodiment.

FIG. 1 illustrates an example of a cloud computing environment, in accordance with an embodiment. As shown in FIG. 1, a cloud computing environment (referred to herein in some embodiments as a cloud environment, or cloud) 10 can generally include a combination of one or more Infrastructure as a Service (IaaS) 20, Platform as a Service (PaaS) 60, and/or Software as a Service (SaaS) 70 layers, which can be delivered as service layers within the cloud environment. The cloud environment can be implemented as a system that includes a computer hardware 15, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components. For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure 30, which provides enablement and management tools that support the various service layers, for example, identity management, virtual assembly builder, system provisioning, tenant management, or other components.

In accordance with an embodiment, the cloud environment can include a PaaS platform component 100 (referred to herein in some embodiments as a PaaS platform, or CloudLogic), which enables the provisioning of enterprise software applications within the environment. For example, the PaaS platform can be provided as an installable software suite that provides a self-service provisioning experience for enterprise applications such as Fusion Middleware (FMW).

As shown in FIG. 1, in accordance with an embodiment, the PaaS platform can include one or more service definition package (SDP) 102, service management engine (SME) 104, virtual assembly (VA) 106, PaaS administration server 108, service domain 110 including one or more service applications (apps) 112 for use by one or more cloud accounts or tenants 113, and/or elasticity manager 114 components.

The example shown in FIG. 1 is provided as an illustration of an exemplary cloud environment and PaaS platform. In accordance with other embodiments, different and/or other types or arrangements of components can be included.

In accordance with an embodiment, the following terms are used herein.

PaaS Platform Component (PaaS Platform, Platform, CloudLogic): In accordance with an embodiment, a PaaS platform component is an installable software suite that provides a self-service provisioning experience for enterprise applications, such as FMW or other enterprise applications.

Site: In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant: In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-tenant: In accordance with an embodiment, a sub-tenant is an entity that exists under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package: In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine: In accordance with an embodiment, a service management engine (SME) provides a generic means to plug any service type into the system. For example, an SME takes care of the service-specific provisioning, lifecycle, management, and monitoring support for a service type or provider type.

Service Type: In accordance with an embodiment, a service type is a representation of software functionality that can be instantiated within the PaaS platform site for a tenant. A service type is created based on an SDP, with additional configuration information supplied by the Platform Administrator. Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment: In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service: In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type: In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider: In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource: In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime: In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type: In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource: In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Quota: In accordance with an embodiment, a quota provides a mechanism to limit consumption of a resource, by establishing an upper bound on the resource usage. Examples of quota-controlled resources include CPU, disk, and the number of VMs in use. PaaS layer quotas can also be supported, for example the number of services that can be provisioned. Quotas can be assigned to tenants, and a Tenant Administrator can allocate their quota to projects or groups which they manage.

Namespaces: In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Platform Administrator/System Administrator (Role): In accordance with an embodiment, a Platform or System Administrator is responsible for installing, configuring, managing, and maintaining the PaaS platform infrastructure and environment, including the resources that are made available to applications running in the environment. The Platform or System Administrator is also responsible for downloading and installing SDPs to support additional service types, setting up or configuring virtualization technology for the platform to use, and installing and configuring providers.

Cloud Account Administrator (Role): In accordance with an embodiment, a Cloud Account Administrator is responsible for the provisioning of new services, management of generic service properties such as their Quality of Service (QoS) settings and their associations, and the locking and termination of services. A Cloud Account Administrator can assign Service Administrators for each service.

Tenant Administrator (Role): In accordance with an embodiment, a Tenant Administrator is responsible for creating sub-tenants and assigning Tenant Administrator to the sub-tenant groups, and for the provisioning of new services, management of generic service properties, and the locking and termination of services. A Tenant Administrator can assign Service Administrators for each service.

Service Administrator (Role): In accordance with an embodiment, a Service Administrator is responsible for administering and managing a specific service after it has been provisioned. A Service Administrator interacts with the service's administration interface to perform administration and management operations.

Service Runtime Administrator (Role): In accordance with an embodiment, a Service Runtime Administrator is responsible for configuring and managing service runtimes.

Application Deployer (Role): In accordance with an embodiment, an Application Deployer deploys an application to the provisioned service, and is responsible for installing, configuring, and running the application. Once the application is running, it can be made available to an End User.

End User (Role): In accordance with an embodiment, an End User is the user of the applications that are deployed to the service. The End User interacts with the user interface provided by the application running in the service. If the service itself provides an interface for users to consume the functionality that it exposes, then the End User can use that service's interface.

Figure 2:
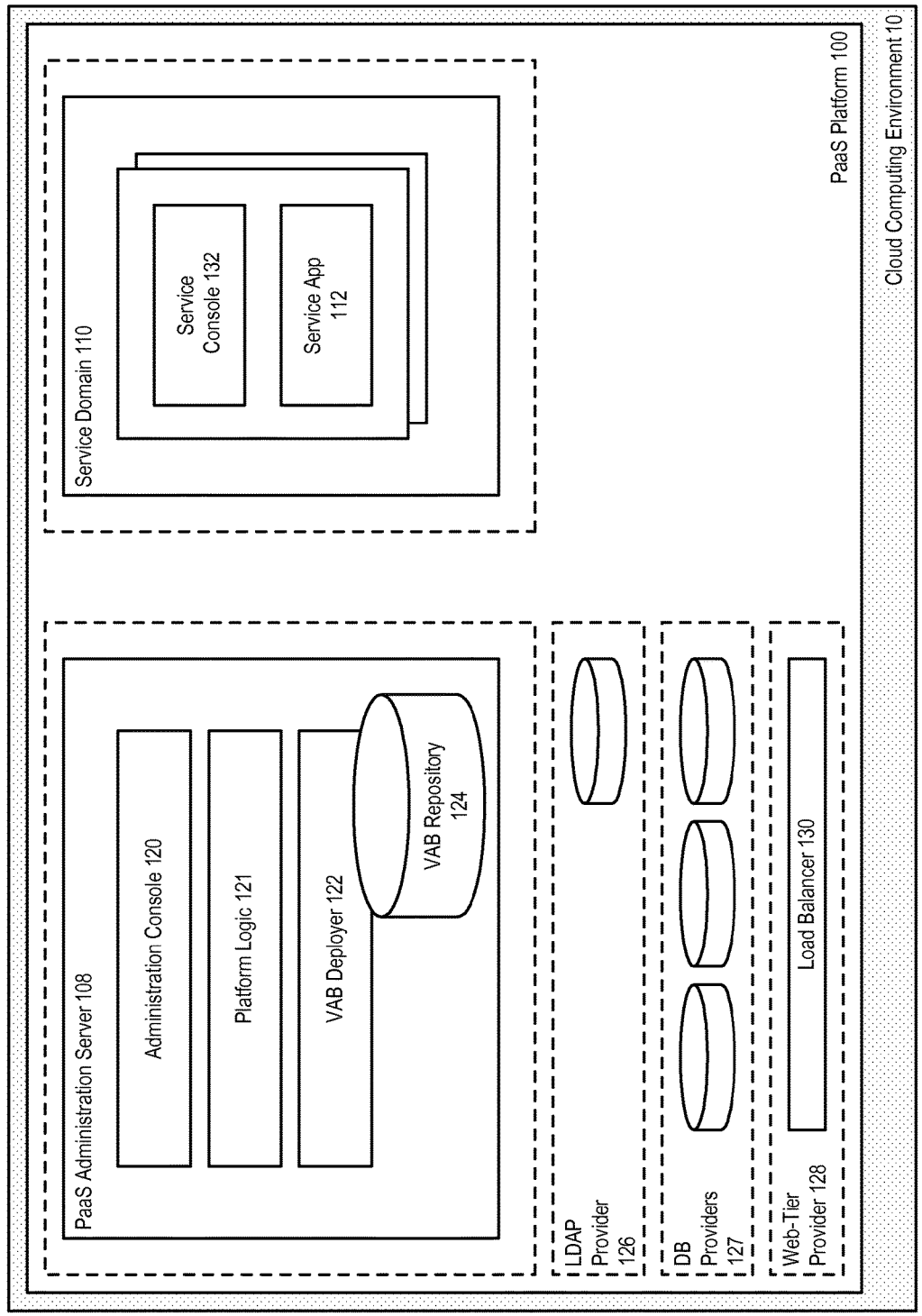
FIG. 2 illustrates a PaaS platform component, including an administration server and a service domain, in accordance with an embodiment.

FIG. 2 illustrates an administration server and a service domain, in accordance with an embodiment. As shown in FIG. 2, in accordance with an embodiment, the PaaS platform (platform) comprises a PaaS administration server 108, which supports an administration console 120, cloud platform provisioning/management logic 121, and virtual assembly builder (VAB) deployer 122, together with a virtual assembly or VAB repository 124. The VAB deployer can be provided by functionality, components, or products such as Oracle Virtual Assembly Builder (OVAB). The VAB deployer (e.g., OVAB Deployer) can then be used by the platform to manage those VMs that will host the servicing applications.

In accordance with an embodiment, the PaaS administration server can be implemented as a WebLogic (WLS) server application, together with, e.g., Glassfish modules embedded therein to provide cloud platform functionality. A service domain, including a service app and service console 132, can be provided for housing enterprise applications, such as FMW applications, that will ultimately service user requests. In accordance with an embodiment, the service domain components may be instantiated multiple times as part of provisioning requests.

In accordance with an embodiment, provider server types that will be used by the PaaS administration server and the service domain, examples of which include LDAP 126, database 127, and Web tier 128 or load-balancer 130 providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

Figure 3:
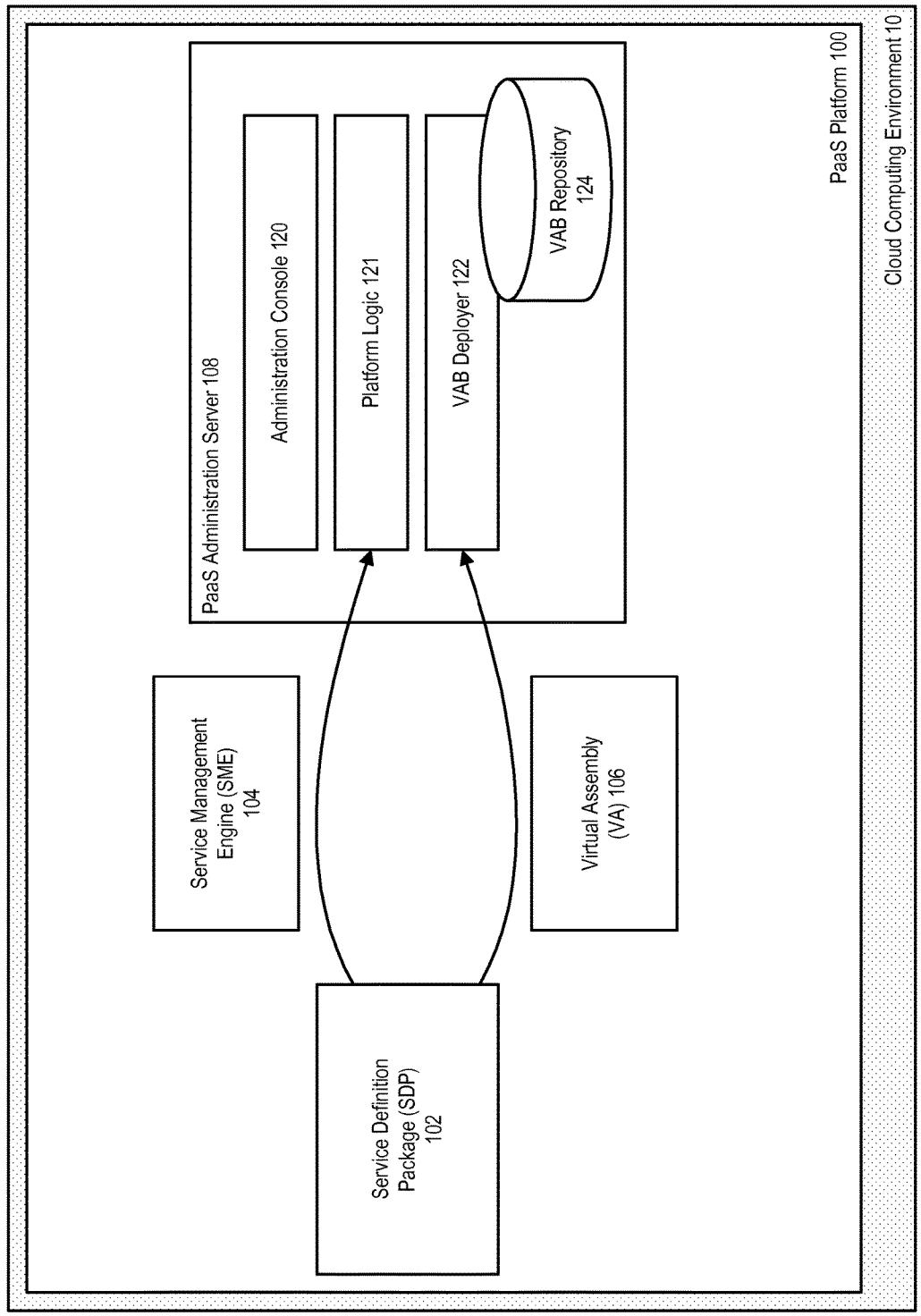
FIG. 3 illustrates the use of service definition packages and service management engines with an administration server, in accordance with an embodiment.

FIG. 3 illustrates the use of service definition packages and service management engines with an administration server, in accordance with an embodiment. As shown in FIG. 3, in accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an OVAB assembly) that contains the topology and configuration of a set of virtual appliances that will comprise a running instance of the enterprise application service, once the assembly is deployed onto a set of VMs.

Figure 4:
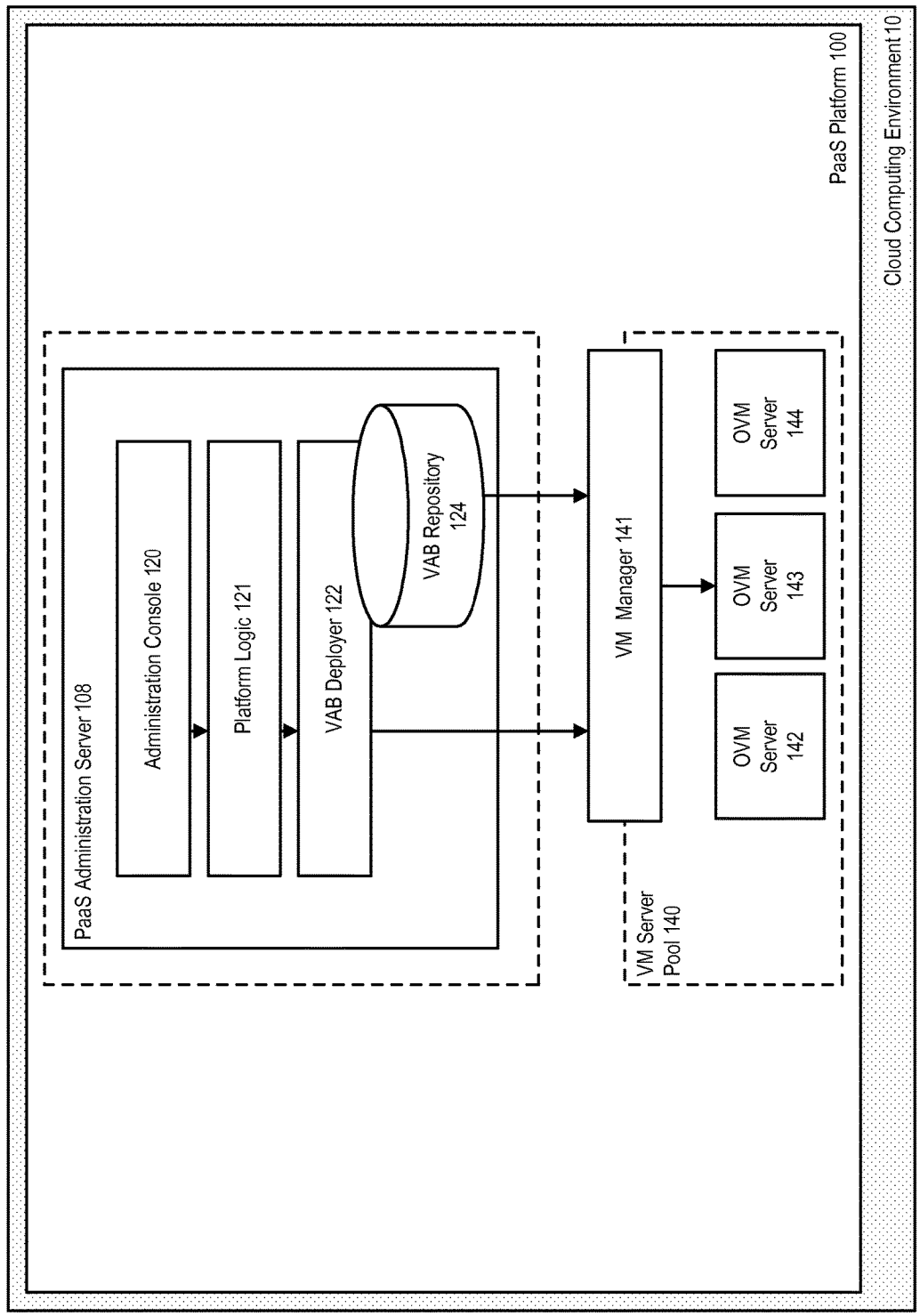
FIG. 4 illustrates the interaction between an administration server and a virtualization manager, in accordance with an embodiment.

FIG. 4 illustrates the interaction between an administration server and a virtualization manager, in accordance with an embodiment. As shown in FIG. 4, in accordance with an embodiment, a VM manager component 141 (e.g., Oracle's OVM Manager) can be used by the PaaS platform to manage the pool 140 of VMs 142, 143, 144, which are then used in instantiating a service assembly. When a request is made from a platform module to instantiate an assembly, or a single appliance in the case of a scale-up request, the VAB deployer application (e.g., OVAB Deployer) can interact with the VM manager to fulfill the request. By delegating the infrastructure/virtualization responsibilities to the VM manager and VAB deployer in this manner, the platform can be abstracted from the target deployment platform.

Figure 5:
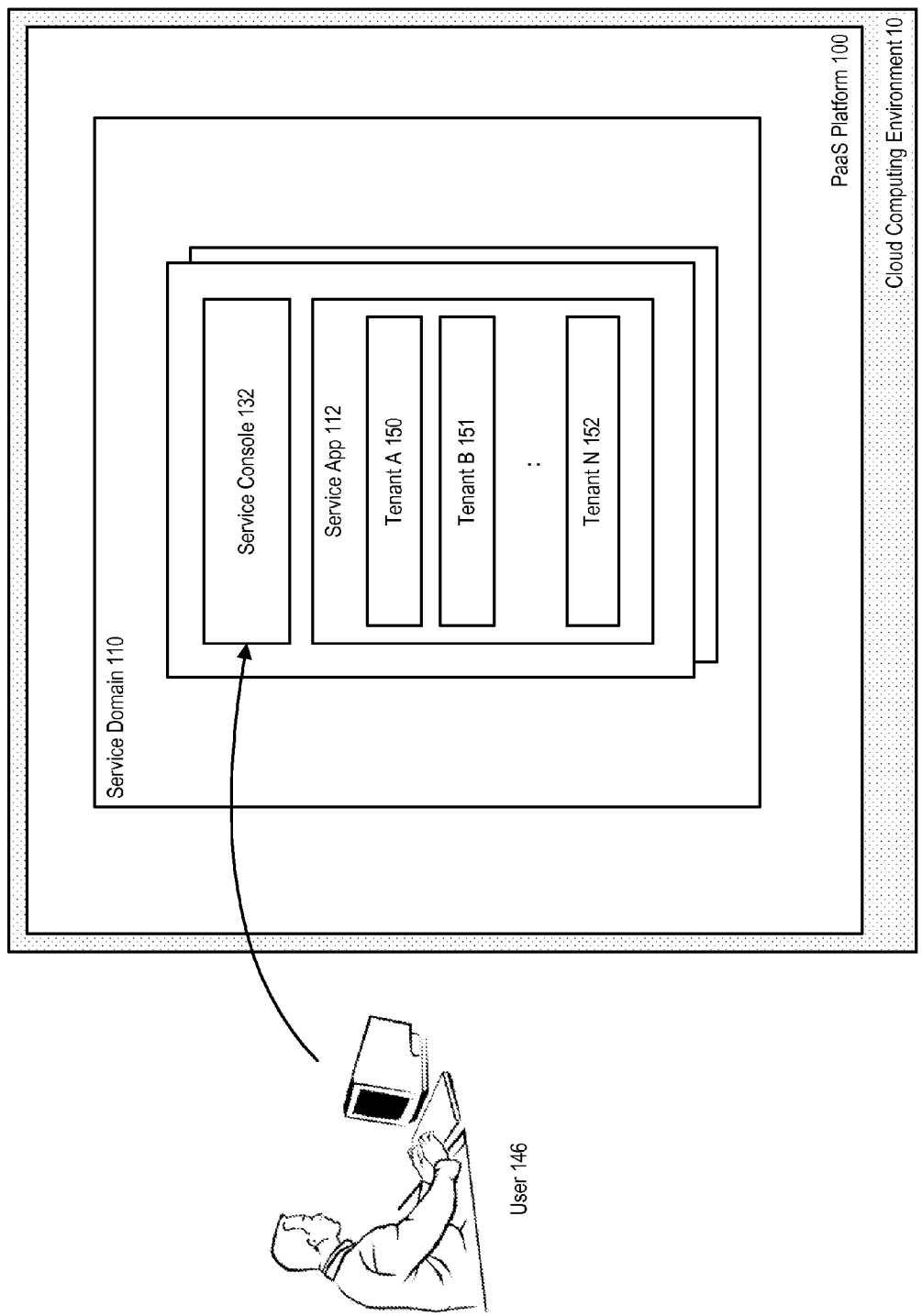
FIG. 5 illustrates a multiple tenant service domain, in accordance with an embodiment.

FIG. 5 illustrates a multiple tenant service domain, in accordance with an embodiment. As shown in FIG. 5, in accordance with an embodiment, a service domain can include multiple tenants 150, 151, 152, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications—these models are instead referred to as using "multitenant" and "dedicated" resources. Alternatively, applications may share resources in a manner that is part of the logical model of the applications; for example, two applications may purposely access a shared database because they intend to operate on the same data—these models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner, during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support a particular tenancy mode; service applications that are not multitenant will only be able to support a single account for each service instance. Once a service has been instantiated from its VM assembly, end users 146 can interact with the system and the instantiated services, in the same manner as they would interact with an on-premise version of that service.

Figure 6:
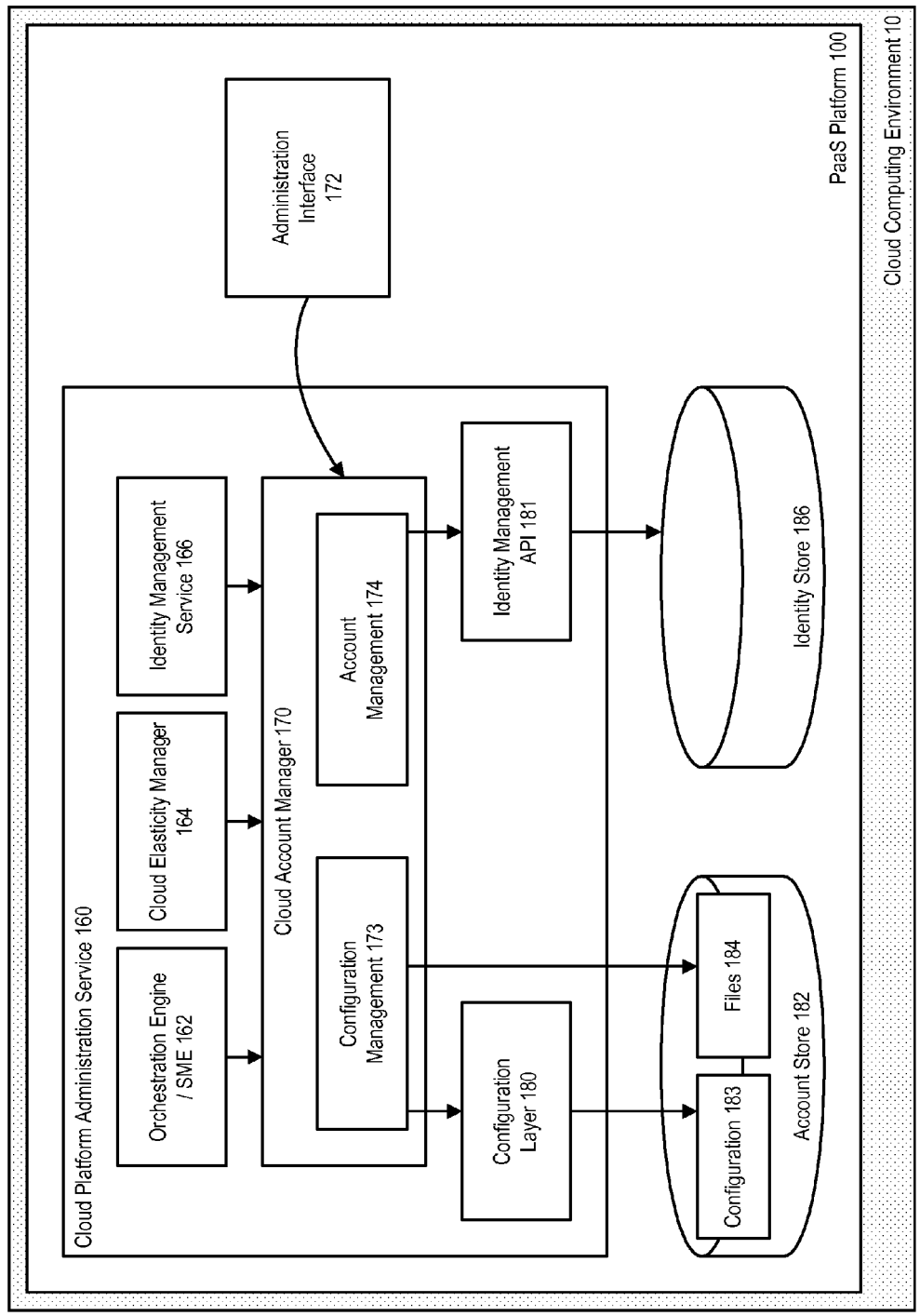
FIG. 6 illustrates a cloud account manager, in accordance with an embodiment

FIG. 6 illustrates a cloud account manager, in accordance with an embodiment. As shown in FIG. 6, in accordance with an embodiment, the PaaS platform can include a cloud platform administration service (CPAS) 160, together with a cloud account manager 170 which supports functions such as account management, and provides a framework that other modules, such as the orchestration engine/SMEs 162, cloud elasticity manager (CEM, referred to herein in some embodiments as an elasticity manager) 164, or identity management service 166), can use to access account-specific data. A configuration management component 173 can use a configuration layer 180 to persist account specific configuration 183 and other files 184 to an account store 182. An account management module 174 provides the ability to manage accounts for a CPAS domain, which can be exposed through the use of a command-line, REST, or other identity management application program interface (API) 181.

In accordance with an embodiment, users can either be managed within an identity store 186 managed by the PaaS platform, or alternatively can be provided from an external, e.g., corporate LDAP, or other means of user identification; and can access the cloud account manager through an administration interface 172. Account and configuration data can also be stored on a file system or other means of storage that is accessible from nodes of a CPAS cluster.

Service Definition Package (SDP)

Figure 7:
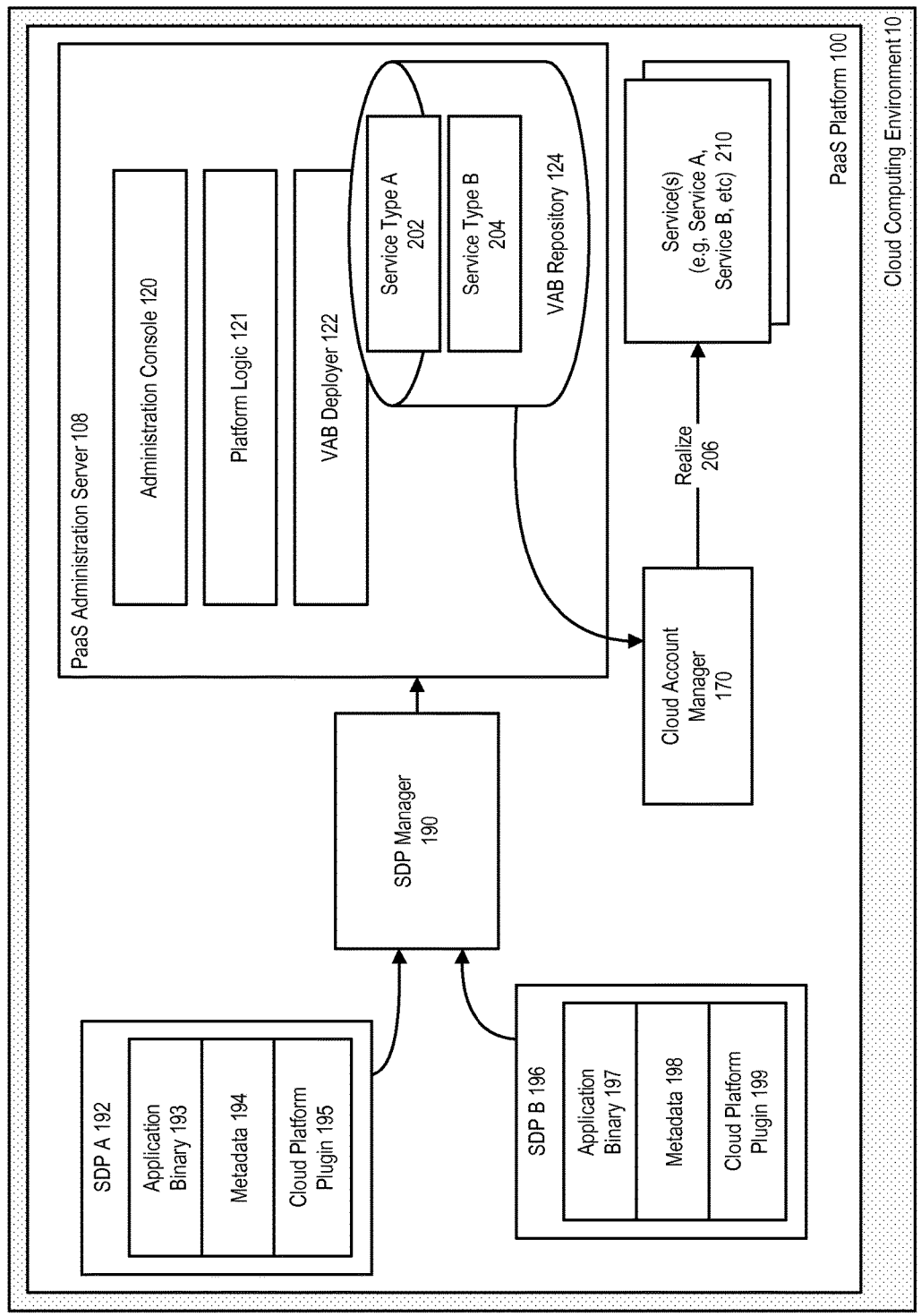
FIG. 7 illustrates the use of a service definition package, in accordance with an embodiment.

FIG. 7 illustrates the use of a service definition package, in accordance with an embodiment. As shown in FIG. 7, in accordance with an embodiment, each SDP 192, 196 can include a binary 193, 197; a metadata 194, 198 (e.g., the SDP name, service type, version, vendor, or virtualization support metadata such as indicating whether the SDP supports OVAB, EC2, or Native); and one or more plugins 195, 199 that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

In accordance with an embodiment, when an SDP is installed into a PaaS platform domain, it is consumed by an SDP Manager 190, which is responsible for obtaining a list of SDPs available to be installed the local system, downloading an SDP if necessary, installing parts of the SDP into the right places, maintaining a list of those SDPs that have been installed, and, if necessary, uninstalling an SDP by uninstalling all of its parts from the places they were previously installed.

In accordance with an embodiment, the SDP manager can interface with other system components by installing an SME plugin to the CPAS, which can then take responsibility for replicating the SME plugin to other CPAS instances in the cluster, installing the VAB assembly 202, 204 into the VAB deployer, interfacing with other tools such as Enterprise Manager to provide a customized console interface for the service if the service provides one, and installing configuration data for the service into the CPAS. Subsequently, during realization 206 of a service, the service 210 can be realized as an instance of those service types defined by the SDP and installed as assemblies in the VAB repository.

Service Management Engine (SME)

Figure 8:
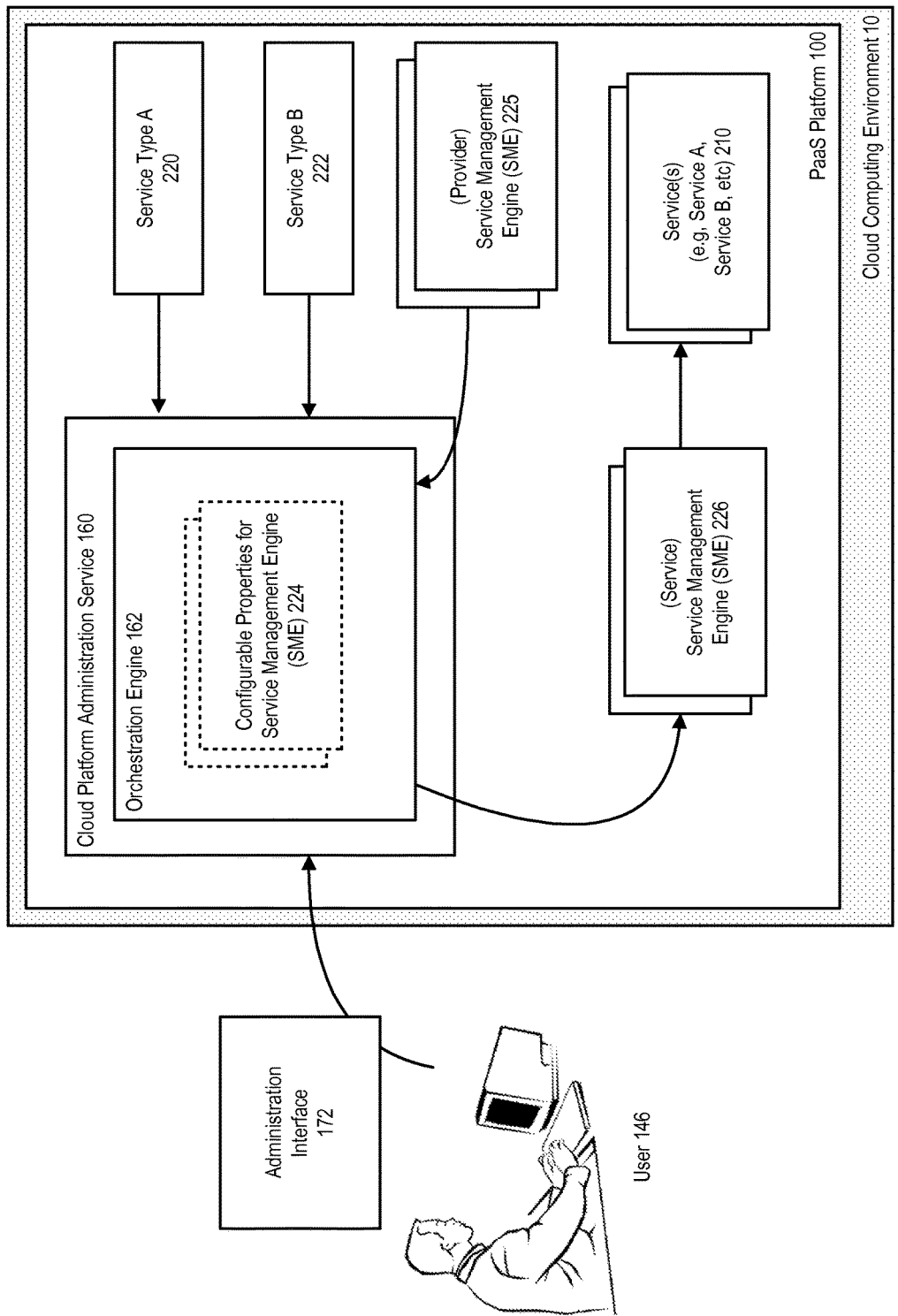
FIG. 8 illustrates the use of a service management engine, in accordance with an embodiment.

FIG. 8 illustrates the use of a service management engine, in accordance with an embodiment. In accordance with an embodiment, a Service Management Engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

Referring to the example shown in FIG. 8, when OVAB is used as a virtualization provider, interaction with the OVAB Deployer can be handled by a virtualization API (e.g., an OVAB client API). In accordance with an embodiment, the orchestration process can then proceed as follows: a Cloud Account Administrator can discover, e.g., SOA service types 220, 222 that are available in the PaaS platform domain, and initiate creation of an, e.g., SOA service. The orchestration engine iterates through the available service SMEs in the system, and determines which service SMEs can handle this service type 224. In this example, the orchestration engine can discover an appropriate SOA SME to handle creation of the SOA service. The orchestration engine can then call into the SME to get all provider dependencies for that SME 225. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME 226 to provision the service.

At this point, the deployment plan is generally complete except for network configurations. In accordance with an embodiment, the deployment plan together with an assembly ID can be pushed, e.g., to the OVAB API, which takes care of filling the deployment plan with the remaining network configurations. Then, the orchestration engine can call, e.g., a Web service API of the OVAB Deployer, to provision the OVAB assembly. Once the assembly is provisioned, the virtual machine information can be retrieved and passed back to the SME, which in turn passes the information back to the orchestration engine. The orchestration engine can then perform any post-provisioning association between the SME and the provider SMEs on which it depends. For example, post-provisioning association between the SOA SME and a load-balancer provider SME may result in the creation of a virtual server to handle and route requests for this SOA service.

Orchestration Engine (OE)

Figure 9:
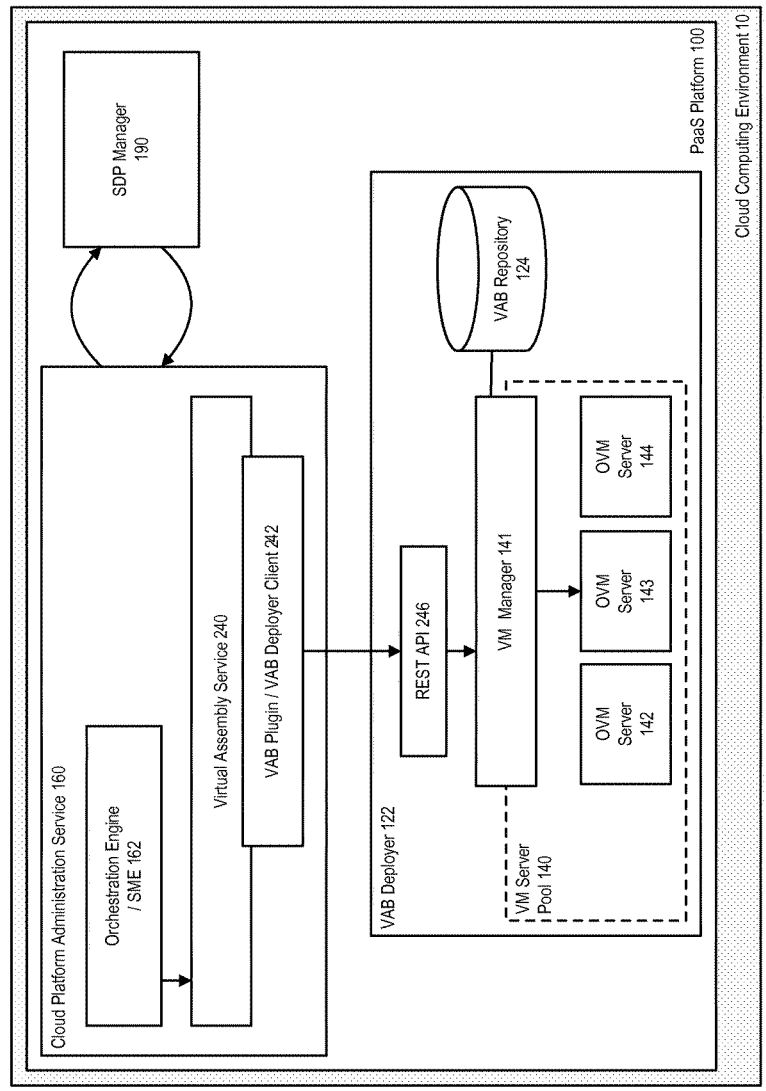
FIG. 9 illustrates the use of an orchestration engine, in accordance with an embodiment.

FIG. 9 illustrates the use of an orchestration engine, in accordance with an embodiment. In accordance with an embodiment, the orchestration engine enables life-cycle management of the services in a PaaS platform. In particular, the orchestration engine coordinates the interactions among various components in the platform domain while creating or managing a service, enables the pluggability of SMEs for various service types in the platform, aids in provisioning the service by selecting appropriate SMEs from among those available in the platform, and helps in managing the configuration of providers such as DB Providers, IDM Providers, and LB Providers.

In accordance with an embodiment, the orchestration engine, as part of creating a service, ensures that dependencies of the service, such as its provider dependencies, are satisfied, by selecting appropriate providers, and coordinating association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the Cloud Account Administrator, including recognizing phases and tasks that match the requirements of the platform for its service creation action, and other life-cycle related activities.

In accordance with an embodiment, the orchestration engine also acts as a gateway for service management, monitoring, scaling actions that could be initiated by other containers in the PaaS platform domain, or by an administrator. For example, the elasticity engine, described in further detail below, can communicate with the orchestration engine to manage, monitor, and scale services based on a service's QoS configuration. The orchestration engine can also play a role in service maintenance actions, such as patching and upgrade, which may require disassociating or re-associating services in a phased manner.

In accordance with an embodiment, services created by a cloud account administrator are visible and accessible only to that particular cloud account (tenant), and are isolated from other cloud accounts in the PaaS platform domain. Such isolation can be provided by the orchestration engine with the help of a cloud account management module.

In accordance with an embodiment, SMEs can be registered with the orchestration engine such that multiple SMEs for a given "family" of service (e.g., "database") can be present in the system. A default SME can also be configured for a particular service family on a per-cloud account basis.

As shown in FIG. 9, in accordance with an embodiment, the orchestration and service management components can interface with the virtualization layer through a virtualization service 240, plugin 242, and virtualization API 246 that abstracts supported virtualization operations. In accordance with an embodiment that uses OVAB, this API can be an OVAB Deployer interface, which enables OVAB Deployer to perform the tasks of assembly creation. In accordance with an embodiment, the orchestration engine/SME can upload and deploys assemblies through the OVAB virtualization API, in addition to managing their lifecycle.

To support developer or demonstration scenarios, in accordance with an embodiment, the system can also implement solutions that run on native OS processes (i.e., with no virtualization). This capability can be implemented by providing a "physical plugin", which implements a portion of the virtualization API.

Elasticity Manager (EM)

Figure 10:
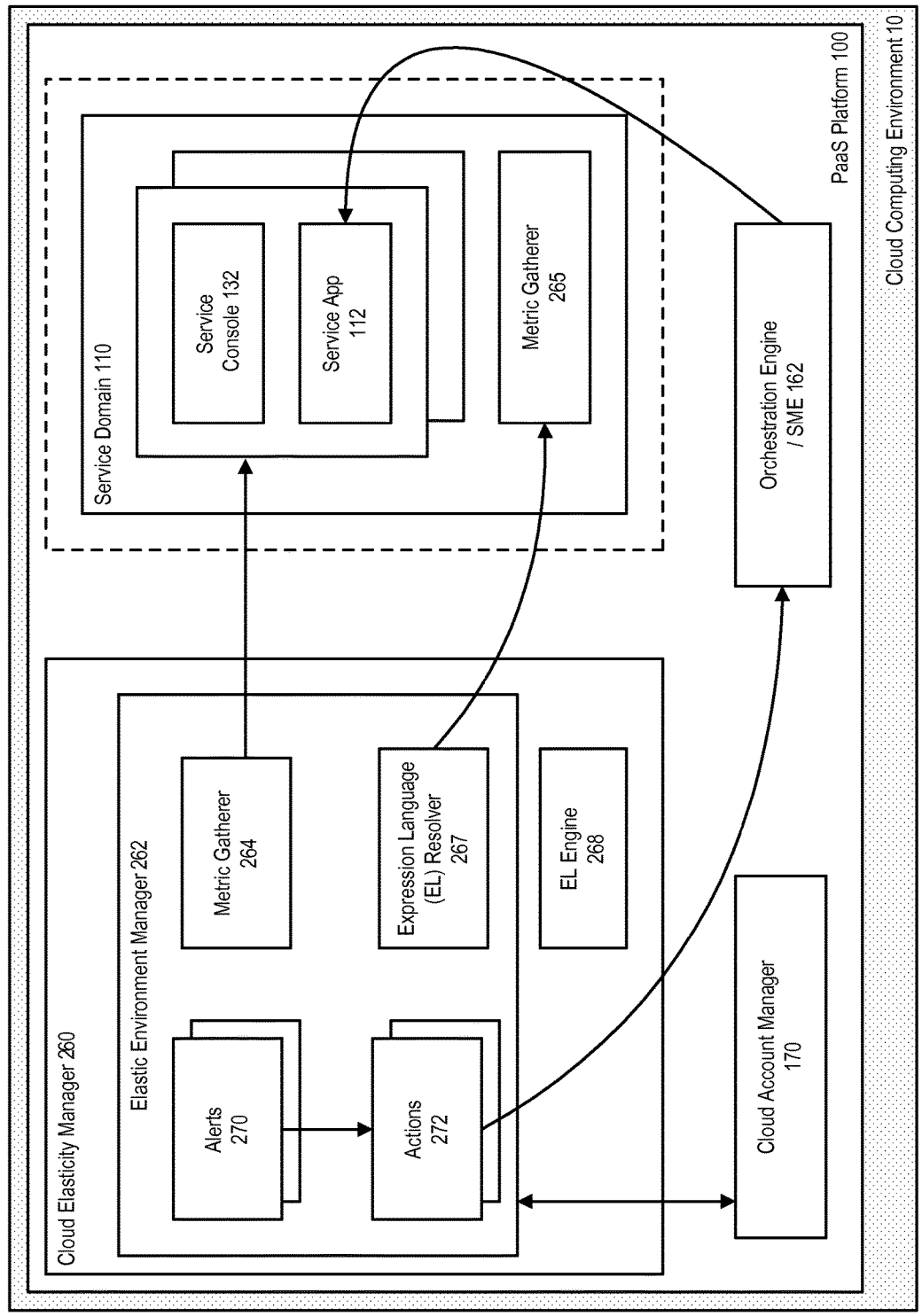
FIG. 10 illustrates the use of an elasticity manager, in accordance with an embodiment.

FIG. 10 illustrates the use of an elasticity manager, in accordance with an embodiment. As shown in FIG. 10, in accordance with an embodiment, the elasticity manager 260, including an environment manager 262, can use metric gatherers 264, 265 and alerts 270, e.g., as HK2 contracts, to determine the health of services running in an environment. Once the state of the environment is determined, the elasticity manager can take appropriate actions 272.

In accordance with an embodiment, a metric gatherer is an object that collects and maintains metric data about a service periodically. For example, a metric gatherer may periodically collect heap statistics such as used or committed memory; or metrics regarding CPU usage. Generally, the metric gatherers provide information about the state of some resource usage. Metrics can also be provided by external monitoring tools, for example by a Java bean component.

In accordance with an embodiment, an alert object periodically checks the health of a service in an environment, by analyzing metric data gathered by one or more metric gatherers over a period of time. For example, an alert may examine CPU usage for a previous several minutes to determine if the environment is under stress. After the alert determines the state of the service or environment, it can execute an action, such as sending an email, logging a message, sending an event, or scaling-up or scaling-down a service. In accordance with an embodiment, an alert can take multiple actions.

In accordance with an embodiment, the elasticity manager can include a unified Expression Language (EL) engine 268, which allows alerts and metric gatherers to be specified as EL expressions. In accordance with an embodiment, the elasticity manager allows external EL Resolver objects 267 to be registered, which enables other types of objects, such as MBeans or POJOs, to be used in an expression.

Update and Patching of SDPs

In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates. In accordance with an embodiment, an update is defined to be a change which has to be made to the system; examples of which include application of a security patch, upgrade of a component, or changing of a configuration value. Depending on the type of update, some updates may require a service or system downtime, while other updates may not require a downtime; and each of these scenarios can be taken into account.

Identity Management (IDM) Providers

In accordance with an embodiment, an identity management (IDM) provider can provide an identity store (e.g., LDAP directory) configuration for use by a cloud platform (e.g., Cloud Logic) service. In accordance with an embodiment, the IDM provider can centrally manage one or more identity store configurations, and supply a particular configuration to the orchestration engine when a service is being provisioned, so that the service can then be launched with an appropriate identity store. This allows a platform administrator to specify identity store configurations once and in one place, instead of having to create an identity store configuration for each service.

In accordance with an embodiment, a particular identity store configuration can be specified for use with a service when a service type is created. Each configuration can be represented with a provider type entry in a domain configuration file. The IDM provider lifecycle and configuration mechanism can be determined by the SDP manager, which can support multiple versions of a particular SDP, and provide isolation from the format of the SDP file. IDM provider handling can be defined by the orchestration engine (OE); while the interfaces of the IDM provider can be defined by a service management engine (SME).

Figure 11:
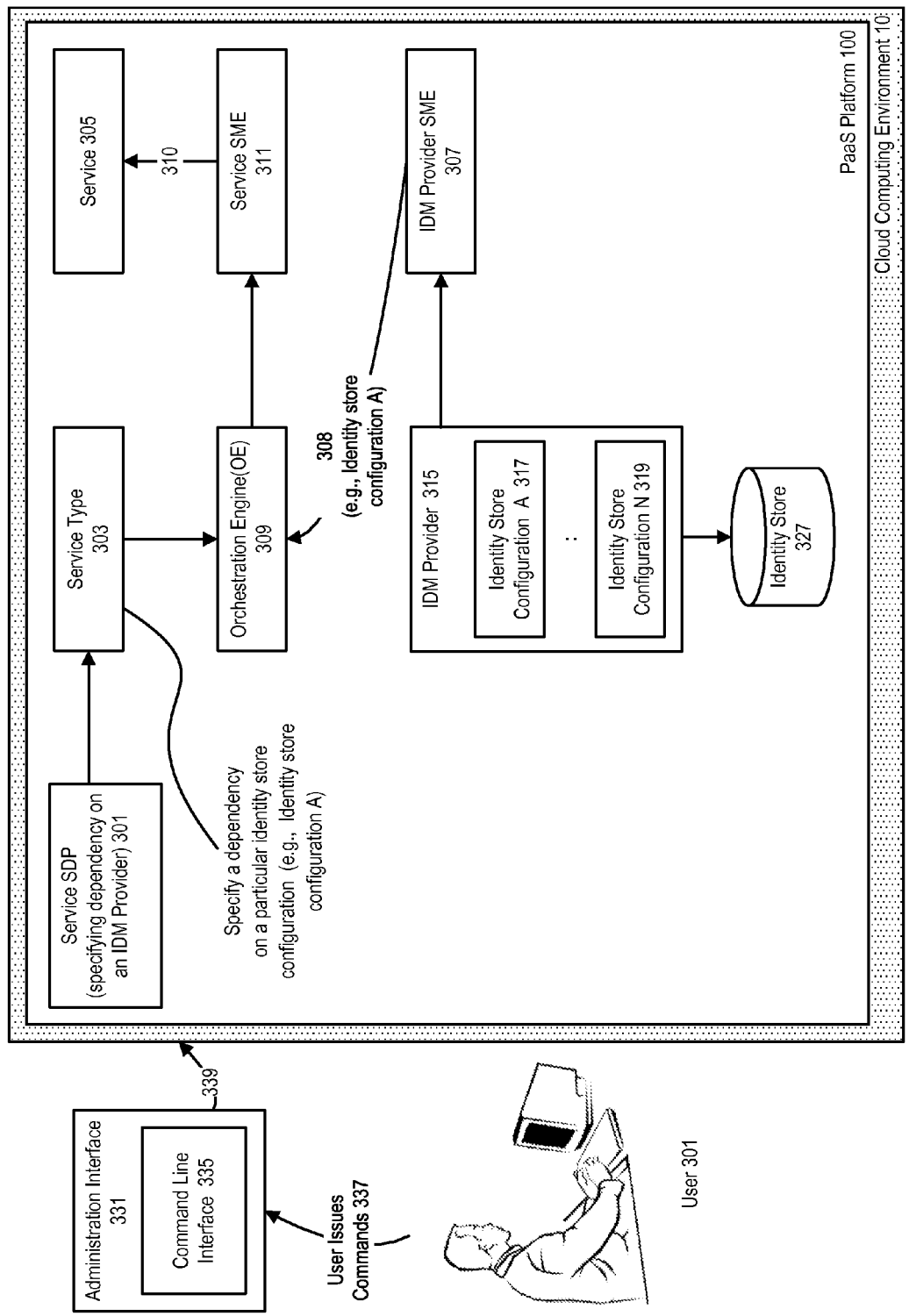
FIG. 11 illustrates a system for providing an identity management provider in a cloud platform environment, in accordance with an embodiment.

FIG. 11 illustrates a system for providing an identity management provider in a cloud platform environment, in accordance with an embodiment.

As illustrated in FIG. 11, in accordance with an embodiment, the system can include a cloud platform component 100 as described above, provided within a cloud computing environment 10, that supports provisioning of enterprise applications. The cloud platform can include a service SDP 301, an IDM provider SME 307, an orchestration engine 309, and an IDM provider 315. An administration interface 331, including a command line interface 335, allows a user 301 to issue commands 337 to interact with 339 various components in the cloud platform.

As further shown in FIG. 11, in accordance with an embodiment, the IDM provider can store and manage multiple identity store configurations 317-319. A service SDP (e.g., a Java service SDP) can declare dependencies on the IDM provider. When a service type 303 is created from the service SDP, a dependency on a particular identity store configuration can be specified, to match one of the multiple identity store configurations stored by the IDM provider. By allowing such a dependency to be specified, the platform administrator is given the option of satisfying IDM provider dependencies for different identity stores in different services.

As an illustrative example, a service type with a declared dependency on a particular identity store configuration can be created as follows:

```
padmin create-provider-type --sdp IDM ldap-corp
padmin create-provider-type --sdp IDM ldap-dept
padmin create-service-type --sdp JavaService
    --dependencies IDM_DEPENDENCY=ldap-dept js-idm-dept-type
```

As illustrated by the commands above, two different provider types, e.g., ldap-corp and ldap-dept, each defining a particular identity store configuration, can be created from a same provider SDP; while a particular dependency, e.g., ldap-dept, can be specified as the identity store dependency of the service type, in this example a JavaService service type.

In accordance with an embodiment, when a service 305 is provisioned based on the service type, the orchestration engine can associate the IDM provider with the service, obtain 308 the identity store configuration specified in the service type from the IDM provider, and invoke the service SME 311 to supply 310 the configuration to the service, so that the service can be launched with a correct identity store configuration. The service's association with the IDM provider can be performed during a pre-provisioning or post-provisioning phase, or during any of the association lifecycle phases.

In accordance with an embodiment, the specified identity store configuration can be used to point to an identity store 327, e.g., an LDAP server. For example, the identity store can be one of an Oracle Internet Directory (OID), an Active Directory (AD), or an OpenLDAP server. In accordance with other embodiments, other types of LDAP servers can be used.

Figure 12:
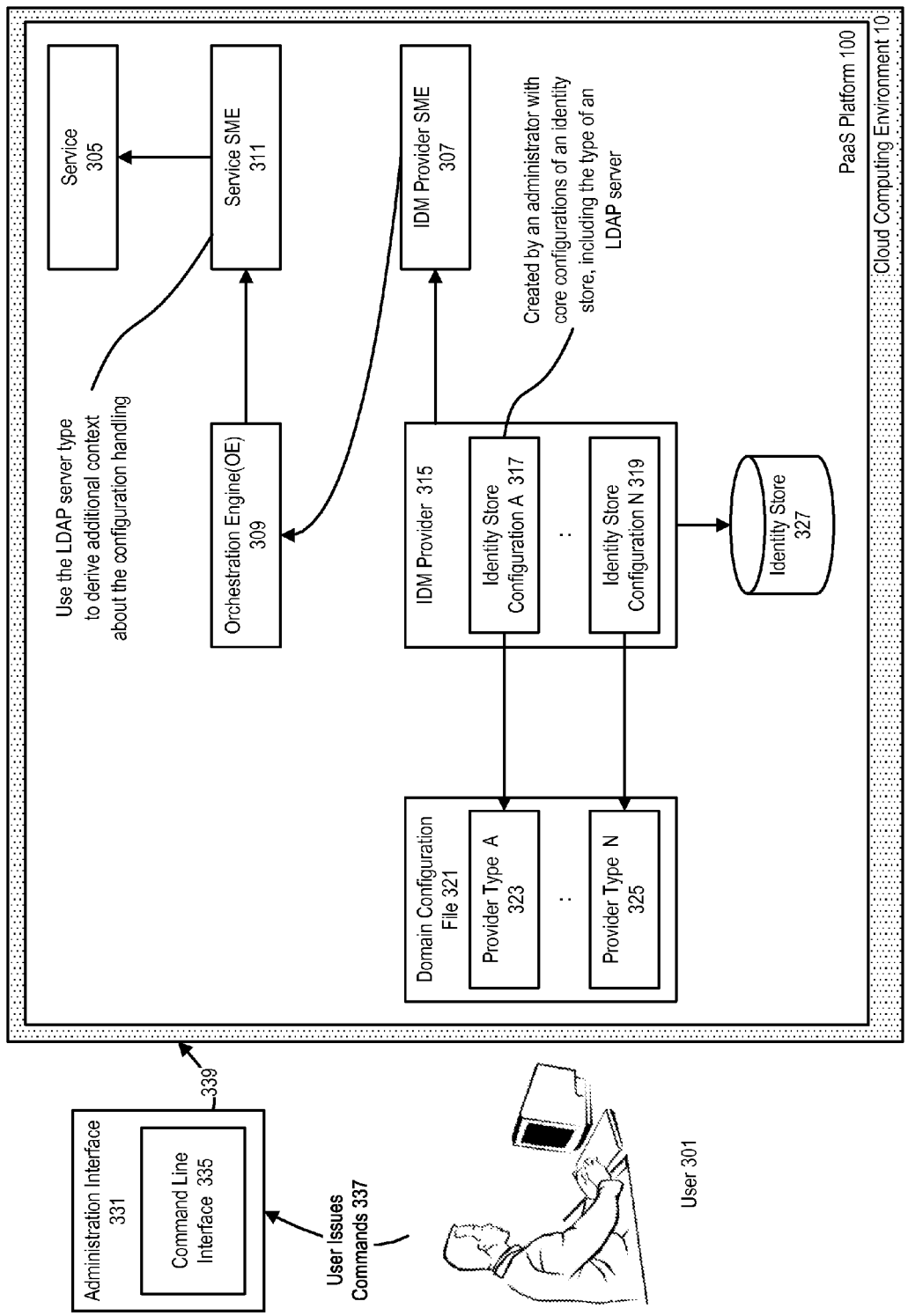
FIG. 12 further illustrates a system for providing an identity management provider in a cloud platform environment, in accordance with an embodiment.

FIG. 12 further illustrates a system for providing an identity management provider in a cloud platform environment, in accordance with an embodiment.

In accordance with an embodiment, the properties of each identity store configuration stored on the IDM provider can be created by the platform administrator using a series of commands. Each configuration (endpoint) can be represented by a provider type entry 323-325, in a domain configuration file 321 (e.g., a domain.xml file). Since an identity store configuration, such as an LDAP configuration, can be complex, involving schemas and filter settings, in order to provide a more usable means of defining an IDM provider configuration, a set of core, e.g., LDAP-related options can be provided when creating an identity store configuration, with a plurality of detailed options defaulted on or derived from a type of LDAP server or server type, or supported from a service by use of service-specific tooling.

As an illustrative example, in accordance with an embodiment, an LDAP server type can be used by the service SME to derive additional context about the configuration handling. For example, a WebLogic Server (WLS) Java service SME can set up LDAP authentication configuration using a specified LDAP authentication type for that service.

In accordance with an embodiment, the IDM provider can support both shared and dedicated tenancy models. The platform administrator can define a configuration that can be used by multiple service types (e.g., a corporate LDAP server); or a configuration for a particular service type in those cases where a dedicated LDAP server may be required (e.g., a departmental LDAP server).

In accordance with an embodiment, although as described above options can be defaulted or derived based on the LDAP server type, the following LDAP-related context must be supplied: Connection User (Principal); Connection Password (Credential); User Base Distinguished Name; and Group Base Distinguished Name. The LDAP server type property can be used by an SME to derive additional context about the configuration handling, if supported by the SME. For example, a WLS Java Service SME may setup the LDAP authentication configuration in a service domain using the specified LDAP authenticator type (e.g., OracleInternet DirectoryAuthenticator).

Table 1 illustrates various properties that a Platform Administrator can enter for LDAP server configuration settings using a create-provider-type command against the IDM provider, in accordance with an embodiment:

TABLE 1

| Property | Default Value | Comments |
| --- | --- | --- |
| IDM Provider Specific | | |
| idm-server-type | OID | OID, ActiveDirectory, OpenLDAP |
| idm-trust-certificate | N/A | Coordinates used to obtain trust certificate from the credential service |
| LDAP Server | — | — |
| idm-credential | N/A | Expected use of Password Alias support |

TABLE 1-continued

| Property | Default Value | Comments |
|---|---|---|
| idm-host | localhost | Single host name or IPV4 address |
| idm-port | 389 | |
| idm-principal | N/A | User connecting to the server in order to perform lookups |
| idm-ssl-enabled | false | A trust certificate (or store) is needed for 1-way SSL support |
| Group Caching | — | — |
| idm-group-hierarchy-cache-ttl | 60 sec | |
| idm-max-group-hierarchies-in-cache | 100 | |
| User | — | — |
| idm-user-base-dn | N/A | |
| idm-user-name-attribute | Varies | Based on server type: cn [generic: uid] |
| idm-user-object-class | Varies | Based on server type: person, user |
| Group | — | — |
| idm-group-base-dn | N/A | |
| idm-static-group-name-attribute | Varies | Based on server type: cn |
| idm-static-group-object-class | Varies | Based on server type: groupofuniquenames, group, groupofnames |
| idm-static-member-dn-attribute | Varies | Based on server type: uniquemember, member |

Association Rules

As described above, in accordance with an embodiment, a service's association with the IDM provider can be performed during a pre-provisioning or post-provisioning phase, or any of the association lifecycle phases. Association rules in the service SDP can include an option to support disabling the validation of the designated service administrator credentials. Such credential validation is not required when the service does not depend on the IDM provider to represent the identity store that contains the service administrative user information. An exemplary service SDP association is illustrated in Listing 1:

Listing 1

```
<dependencies>
    <provider name="IDM_DEPENDENCY" optional="true">
        <selection-criteria>
            <family>IdentityManagement</family>
        </selection-criteria>
        <association-rules>
            <phase>post-provisioning</phase>
            <parameters>
                <parameter name=
                "IdentityManagement.ValidateServiceAdminCredentials"
                value="false"/>
            </parameters>
        </association-rules>
    </provider>
</dependencies>
```

In the example illustrated in Listing 1, during a post-provisioning phase, the value of the "IdentityManagement.ValidateServiceAdminCredentials" can be set to false, indicating that the option for validating the service administrator credentials is disabled.

Creation of Provider Service Definition Package (SDP)

In accordance with an embodiment, the IDM provider can operate with a service SDP that requires the IDM provider to supply external LDAP endpoint configuration data. The IDM provider can be based on a provider SDP, which includes a service definition file as illustrated in Listing 2:

Listing 2

```
<? xml version="1.0" encoding="UTF8"?>
<service-definition
    xmlns="http://www.oracle.com/ns/cloudlogic/
    service-definition_1_0"
    xmlns:xsi="http://www.w3.org/2001/XMLSchema-instance"
    xsi:schemaLocation="http://www.oracle.com/ns/
    cloudlogic/service-definition_1_0
    http://www.oracle.com/ns/cloudlogic/
    service-definition_1_0/service-definition.xsd"
    name="LDAP IDM Provider" vendor="Oracle Corporation"
    version="1.0">
    <tenancy model="ANY"/>
    <characteristics>
        <family>IdentityManagement</family>
        <characteristic>
            <name>vendor</name>
            <value>Oracle</value>
        </characteristic>
        <characteristic>
            <name>product</name>
            <value>LDAP</value>
        </characteristic>
        <characteristic>
            <name>version</name>
            <value>1.0</value>
        </characteristic>
    </characteristics>
    <service-management-engine
    id="com.oracle.cloudlogic.paas.idm.ldap">
        <file>
            <location>paas.idmldapprovider. jar</location>
        </file>
    </service-management-engine>
    <parameters>
        <parameter name="idm-host" value="localhost"
            optional="true" />
        <parameter name="idm-port" value="389"
            data-type="INTEGER" optional="true" />
        <parameter name="idm-principal"
            optional="false" />
        <parameter name="idm-credential"
            optional="false" />
        <parameter name="idm-user-base-dn"
            optional="false" />
        <parameter name="idm-group-base-dn"
            optional="false" />
        <parameter name="idm-ssl-enabled"
            value="false" data-type="BOOLEAN" optional="true" />
        <parameter name="idm-server-type"
            optional="true" />
    </parameters>
</servicedefinition>
```

As illustrated in Listing 2, in accordance with an embodiment, the service definition file can contain metadata for the SDP, such as tenancy model, characteristics, service SME plugin location, configuration or other metadata.

Service Management Engine (SME) Plugin

In accordance with an embodiment, the IDM provider supports an SME plugin interface to handle the association phase of a service with a provider. During association with the IDM provider, the IDM provider SME can obtain, e.g., the Service Administrator credentials for validation with the external LDAP server, if supplied. The service SME can obtain IDM provider endpoint data that is used to configure the service domain via an association result object.

Interaction Between Identity Store and Service Configuration

In accordance with an embodiment, when a service is provisioned based on a service type during the create-service operation, the service configuration can be set up to use an associated IDM provider configuration. The service SME can obtain the associated LDAP configuration from the IDM provider, and provision the service to use the LDAP configuration.

In order to obtain a specific provider configuration or provider type, the service SME can implement an association handler object interface, and read the properties via an association result object from the IDM provider.

For example, when a Java service is provisioned based on the service type during the create-service operation, the Java service configuration can be setup to use the associated IDM provider configuration. The Java service SME will be responsible for obtaining the specific LDAP endpoint data and provisioning the service to use the external LDAP configuration. In order to obtain the specific endpoint data (i.e., provider type), the Java service SME can implement an association handler interface, and read the properties from the IDM provider association object or association result.

Validation of Service Administrator Credentials

As described above, in accordance with an embodiment, the IDM provider allows the platform administrator to specify identity store LDAP configurations once and in one place instead of having to configure each service. A PaaS environment generally will not provision a service where the service administration interface is not usable or accessible. As such, in accordance with an embodiment, the IDM provider supports the ability to validate service administrator credentials when the service administration user resides in the identity store represented by the IDM provider. The IDM provider SME can obtain the service administrator credentials for validation with an external LDAP server.

In accordance with an embodiment, the IDM provider can implement a validator interface, e.g., com.oracle.cloudlogic.service.spi.ServiceConfigurationValidator, to verify LDAP connection credentials and check for other configuration issues (e.g., that a trust certificate is defined when SSL is enabled). In the event that a service administrator is created local to the service or is not accessible to the IDM provider, the service can set an association rule disabling the IDM provider validation logic during the association phase, e.g., by setting "Identity Management.ValidateServiceAdminCredentials" to false.

Credential and Certificate Storage Handling (SSL Support)

In accordance with an embodiment, connections to the LDAP server can be established using the configured principal and credential properties of the IDM provider type. When SSL is enabled, an SSL port can be specified in the properties of an IDM provider type. Credentials can be stored and retrieved using a password alias support service to properly obfuscate the password on command lines and in configuration files. An LDAP server trust certificate (i.e., Certificate Authority) can be stored and retrieved using a key and credential service, to allow for proper access and sharing between the provider and service SMEs.

Progress Status

In accordance with an embodiment, the IDM provider can support progress status handling by calling an API available from the IDM provider association handler implementation.

IDM Provider Method

Figure 13:
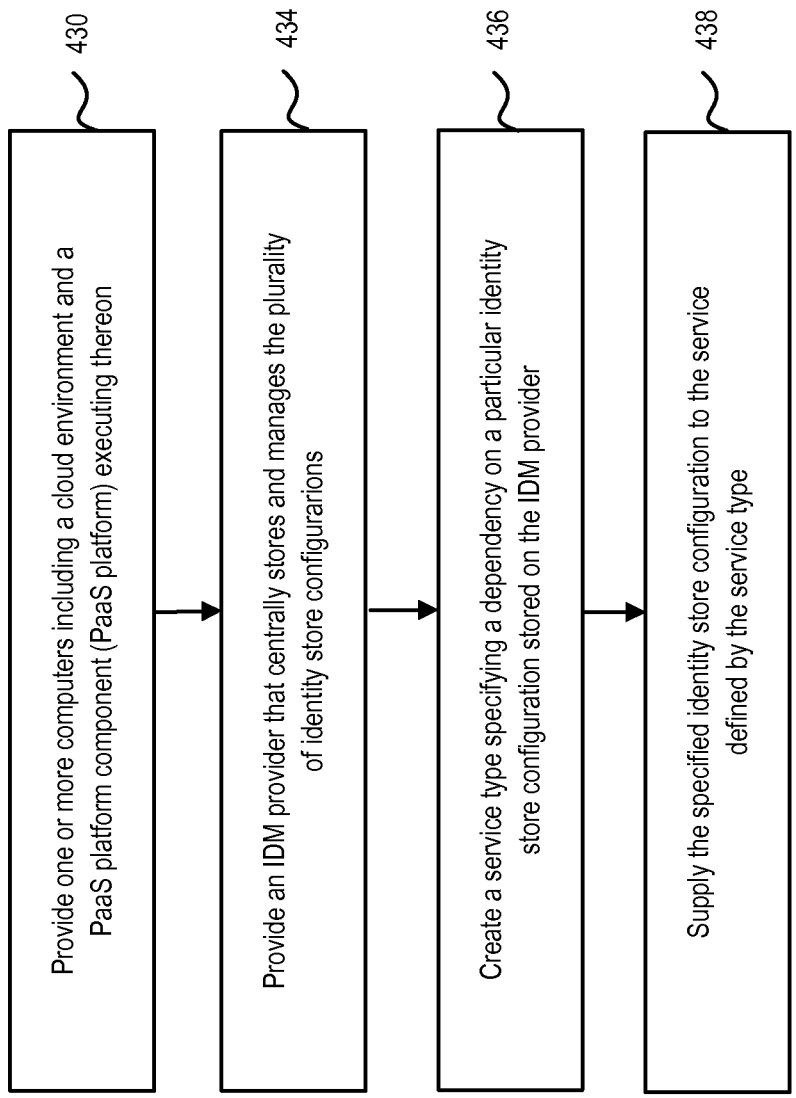
FIG. 13 illustrates a method for providing an identity management provider in a cloud computing environment, in accordance with an embodiment.

FIG. 13 illustrates a method for providing an identity management provider in a cloud computing environment, in accordance with an embodiment.

As shown in FIG. 13, in accordance with an embodiment, at step 430, one or more computers including a cloud environment and a PaaS platform component (PaaS platform) executing thereon, are provided.

At step 434, an IDM provider that centrally stores and manages a plurality of identity store configurations is provided. In accordance with an embodiment, each identity store configuration is created by a platform administrator and can be represented with an IDM provider type entry in a domain configuration file.

At step 436, a service type can be created from a service SDP that specifies a dependency on the IDM provider, wherein the service type can further specify a dependency on a particular identity store configuration stored on the IDM provider.

At step 438, the specified identity store configuration can be obtained from the IDM provider and supplied to the service for use.

Webtier Providers

In accordance with an embodiment, the service types made available in a cloud platform (e.g., CloudLogic) domain can include information which describes dependency on a webtier provider, which in turn provides load-balancing capability to a service whose deployment may span multiple virtual machines. A webtier provider can associate one or more provisioned services with a webtier runtime, to satisfy the webtier dependency of a service. After a service is provisioned, a webtier provider service management engine (SME) can associate the service with a webtier runtime by creating a configuration therein. The webtier runtime can subsequently provide a single point of access to the service, including load-balancing requests to service nodes, or providing support for additional capabilities such as failure detection and failover.

In accordance with an embodiment, when a service is updated, corresponding changes can be made to an associated webtier runtime (e.g., an Oracle Traffic Director (OTD), or Oracle HTTP Server (OHS) runtime). When the service is stopped, the webtier runtime can prevent access to the service. The webtier runtime can also serve as a coordinator in applying rolling upgrades to the service.

In accordance with an embodiment, when a service is created, a locator such as a URL for the service can be generated and provided to the webtier runtime by the webtier provider For each provisioned service, the webtier provider SME can configure the webtier runtime by creating a virtual server configuration, origin server pool configuration, and other configurations necessary for load balancing in the webtier runtime. The configurations can then be used to direct incoming requests for the service, to server nodes in an origin server pool that hosts the service, based on the URL of the service.

Virtual Server Configuration Creation

In accordance with an embodiment, the webtier runtime provider can be configured with a base domain name, with each provisioned service then having its own domain name created based on certain parameters. A complete domain (URL) for a service can be generated using a combination of a service name, an account name, and a base domain name.

As an illustrative example, the URL for a service administrator can be admin-javasvc1-acct1.cloudlogic.com, and the URL for an end user can be javasvc1-acct1.cloudlogic.com, where "javasvc1" is the service name, "acct1" is the account name, and "cloudlogic.com" is the base domain name.

In accordance with an embodiment, an origin server pool can be created by mapping servers/nodes created as part of a service creation. The virtual server configuration on the webtier runtime can map incoming requests on a virtual host name pattern (which can match the service's domain name) to servers/nodes in the origin server pool.

Pool and Origin Servers

As described above, in accordance with an embodiment, a webtier provider is configured with a base domain name, with each service having its own domain name based on certain parameters. In accordance with an embodiment, the process or pattern to generate a domain name for a particular service can be as follows:

A domain name is created using a combination of service-name and account-name.

A virtual server configuration is created per service which matches the domain name pattern for that service.

An origin server pool is created mapping the servers/nodes created as part of service.

The virtual server configuration maps all the incoming requests on the host name (which must match service's domain name) pattern to the servers/nodes in a particular origin server pool, thus enabling the load-balancing of requests.

In accordance with an embodiment, a service admin domain name can be created based on admin-<service-name>-<account-name>.<base-domain-name>, for example admin-javasvc1-acct1.cloudlogic.com. A service end-user domain name can be created based on <service-name>-<account-name>.<base-domain-name>, for example javasvc1-acct1.cloudlogic.com.

In accordance with an embodiment, the origin server pool is a pool of origin servers, wherein each origin server points to one of the service nodes, and can be configured for either HTTP or HTTPS protocol access, and is considered to be homogeneous.

Figure 14:
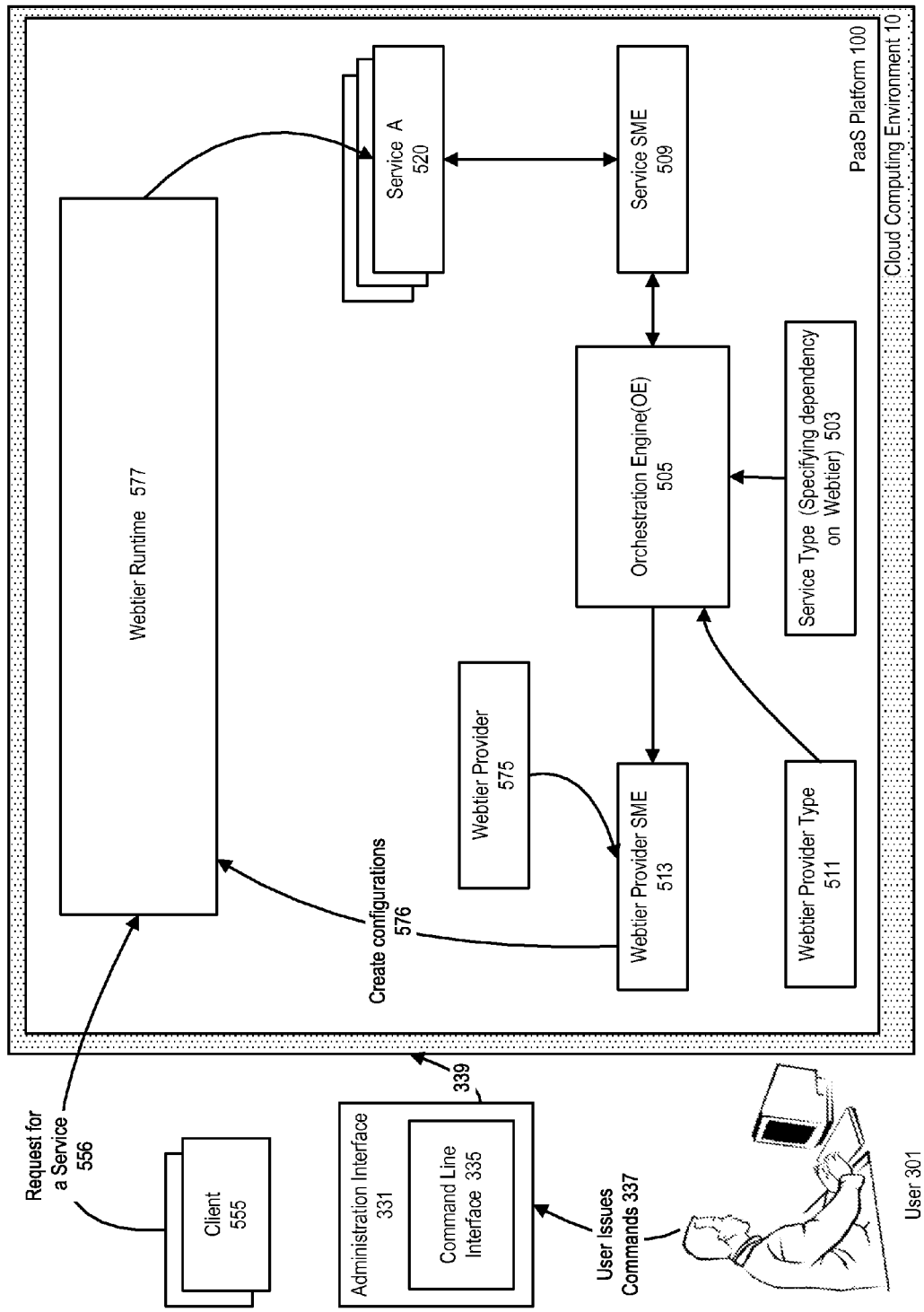
FIG. 14 illustrates a system for associating services with a webtier runtime in a cloud platform environment, in accordance with an embodiment.

FIG. 14 illustrates a system for associating services with a webtier runtime in a cloud platform environment, in accordance with an embodiment.

As illustrated in FIG. 14, in accordance with an embodiment, the system can include a cloud platform component 100 as described above, provided within a cloud computing environment 10, that supports provisioning of enterprise applications. The cloud platform can include a service type 503, a service SME 509, a webtier provider type 511, and a webtier provider SME 513. An administration interface 331, including a command line interface 335, allows a user 301 to issue commands 337 to interact with 339 various components in the cloud platform.

In accordance with an embodiment, when a service is to be created, an orchestration engine 505 can invoke the service's SME to create an instance of a service 520 based on the service type. After the service is provisioned, the orchestration engine can perform a post-provisioning association between the service SME and the webtier provider SME, based on the dependency specified in the service type.

As a result of this association, the webtier provider SME, using information from a webtier provider 575, can create various configurations 576 on a webtier runtime 577 to handle and route requests 556 from a client 555 to the provisioned service.

Figure 15:
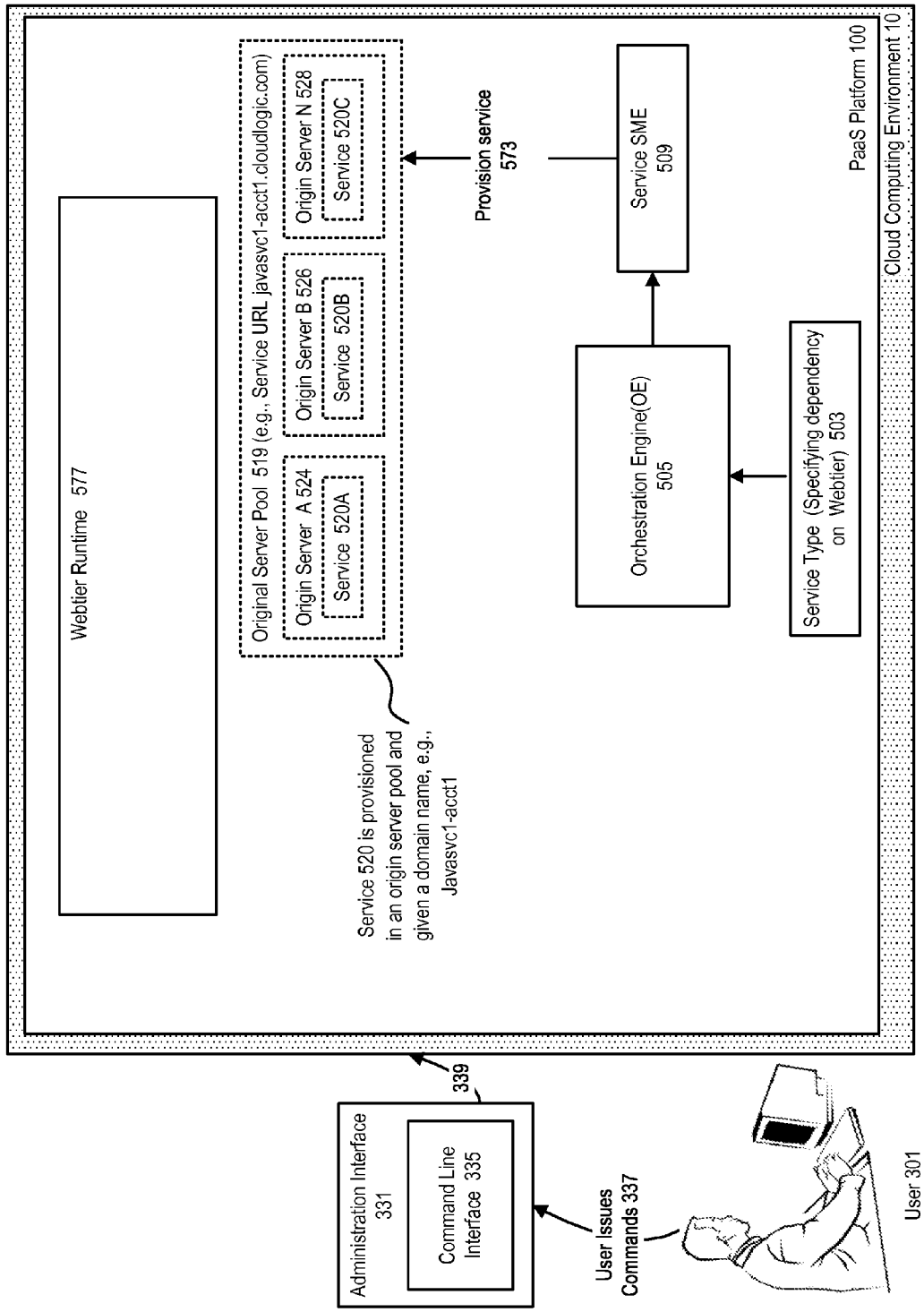
FIG. 15 further illustrates a system for associating services with a webtier runtime in a cloud platform environment, in accordance with an embodiment.

FIG. 15 further illustrates a system for associating services with a webtier runtime in a cloud platform environment, in accordance with an embodiment.

As shown in FIG. 15, in accordance with an embodiment, the orchestration engine can invoke the service SME to create the service, which can be provisioned 573 in an origin server pool 519. In accordance with an embodiment, the origin server pool comprises a plurality of service nodes 524, 526, 528, wherein each node can host an instance of the service, e.g., 520A, 520B, 520C.

As described above, in accordance with an embodiment, the service can be given a domain name based on certain parameters; for example, the service domain name can be created based a combination of the service name and an account name, e.g., javasv1-acct1.

Figure 16:
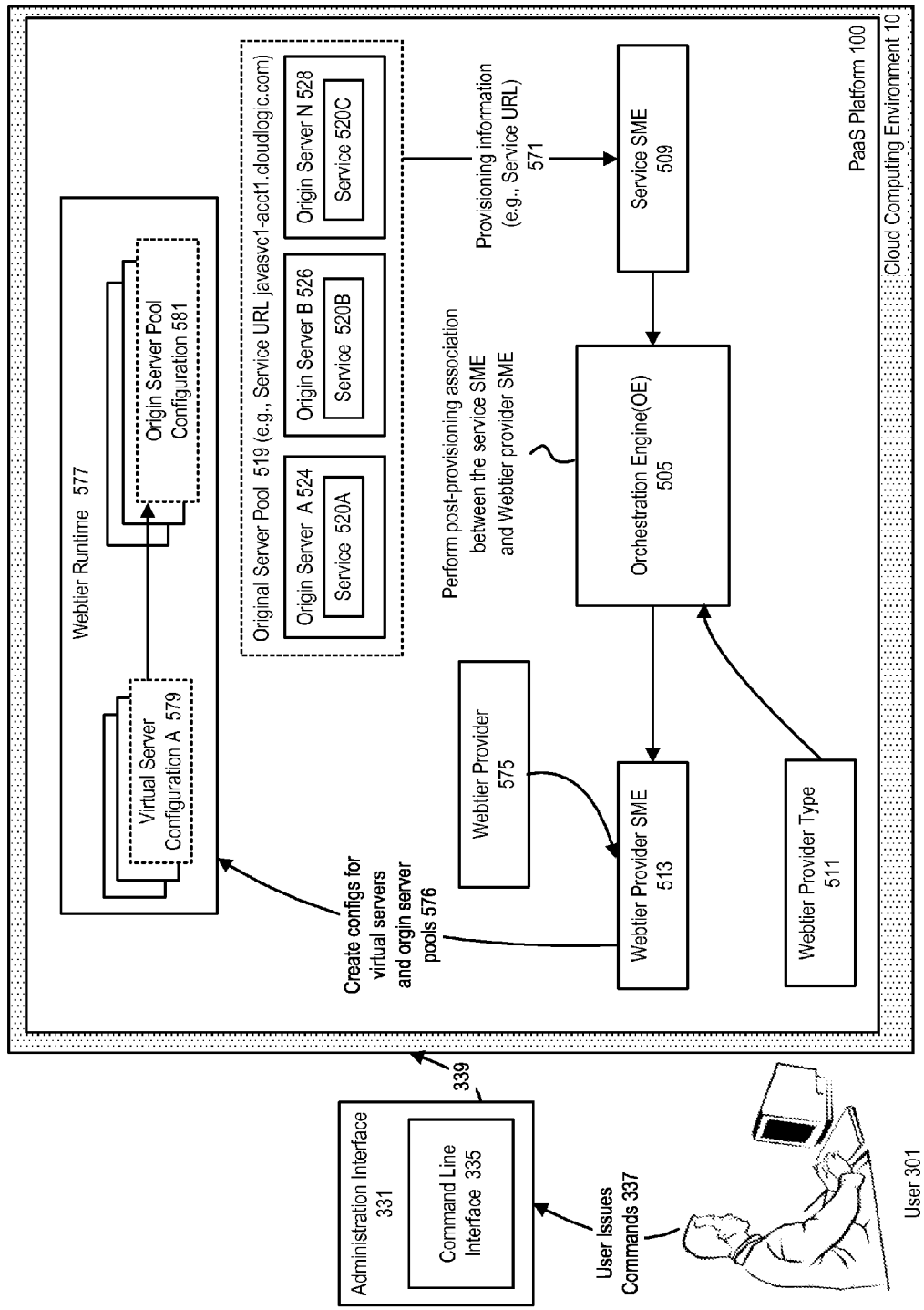
FIG. 16 further illustrates a system for associating services with a webtier runtime in a cloud platform environment, in accordance with an embodiment.

FIG. 16 further illustrates a system for associating services with a webtier runtime in a cloud platform environment, in accordance with an embodiment.

As shown in FIG. 16, in accordance with an embodiment, after the service is provisioned, the orchestration engine can invoke the webtier provider SME to configure the webtier provider runtime using information from the webtier provider, and the provisioning information obtained 571 by the service SME.

Webtier Provider SDP

In accordance with an embodiment, a webtier tier SDP can be defined by a service definition (e.g., xml) file and webtier provider SME. The service definition file can be used to capture all configurable properties for a particular (e.g., OTD-based) webtier provider. An example service definition is illustrated in Listing 3:

Listing 3

```
<?xml version="1.0" encoding="utf8"?>
<!Copyright
(c) 2012 Oracle and/or its affiliates. All rights reserved. \>
<service-definition name="OTD" vendor="Oracle" version="1.0">
    <tenancy model="ANY"/>
    <characteristics>
        <family>Webtier</family>
        <characteristic>
            <name>vendor</name>
            <value>Oracle</value>
        </characteristic>
        <characteristic>
            <name>product</name>
            <value>oracle-traffic-director</ value>
        </characteristic>
        <characteristic>
            <name>version</name>
            <value>12.1.2.1.1</value>
        </characteristic>
    </characteristics>
    <service-management-engine id="org.glassfish.paas.webtier.otd">
        <file>
            <location>sme/paas.otdplugin. jar</location>
        </file>
    </service-management-engine>
    <parameters>
        <parameter name="lb-admin-user-name" />
        <parameter name="lb-install-dir" />
        <parameter name="lb-config-name" />
        <parameter name="lb-services-base-domain-name" />
        ...
    </parameters>
</service-definition>
```

In accordance with an embodiment, the service definition can capture configurable properties used to configure the webtier runtime—for example, the IP address of the machine at which the webtier runtime is installed, the installation directory, the user name to access the machine and the webtier runtime installation, the name of the default origin server pool created in the installation instance, and the base domain name to be used to generate a complete domain name for a service. Table 2 illustrates additional configurable properties for a webtier runtime, in accordance with an embodiment:

TABLE 2

| Name | Description | Default Value |
| --- | --- | --- |
| lb-machine-ip-addr | IP address of machine where OTD is installed | — |
| lb-machine-ip-addr-name | The user name to access machine as well OTD installation. OTD will be installed using that user name | — |
| lb-machine-ssh-private-key | SSH private key to access machine where OTD is installed via ssh | — |
| lb-install-dir | OTD install dir. This is required to access tadm CLI | — |
| lb-config-name | Admin user name to be used while running tadm command | Admin |
| lb-admin-password | Password file having password for admin user | — |
| lb-default-origin-server-pool-name | Name of default origin server pool created in OTD instance | — |
| lb-services-base-domain-name | Based domain name to be used to generate complete a domain name for service | — |
| lb-services-default-healthcheck-url | The default health check url applicable for all services | "/" |
| lb-services-default-healthcheck-interval | The default health check interval applicable for all services | 30 seconds |
| lb-services-default-healthcheck-timeout | The default health check timeout applicable for all services | 60 seconds |
| lb-service-default-cert-input-file | Default input file which can be used to generate the certificates for services | — |
| lb-services-end-to-end-ssl | The default end to end ssl settings for webtier | False |

As further shown in FIG. 16, in accordance with an embodiment, for each provisioned service, the webtier provider SME can configure the webtier runtime using the configuration properties from the webtier provider, including creating a virtual server configuration and an origin server pool configuration for each provisioned service.

For example, the webtier provider SME can create a virtual server configuration A 579, and an origin server pool configuration 581 for the provisioned service 520.

In accordance with an embodiment, the virtual server configuration is created for a virtual server that accepts requests from a URL of the provisioned service. The virtual server configuration matches the domain name pattern of the service. For example, for a service whose domain name is javasvc1-acct1, the virtual server for the service can be configured with the same domain name.

In accordance with an embodiment, the origin server pool configuration can comprise information about server nodes on which the service has been provisioned, e.g., host-port pairs for each service node. Each virtual server configured for a service can be associated with an origin server pool configured for that service. When the webtier runtime has an SSL port enabled, the webtier provider SME can create a certificate matching the domain name of the service.

In accordance with an embodiment, a health monitoring configuration can be generated per origin server pool, and thereafter used by the webtier runtime for failure detections. The health monitoring configurations can be created using the default values provided at the time of registration of a provider runtime, or values provided at service type/service creation.

Figure 17:
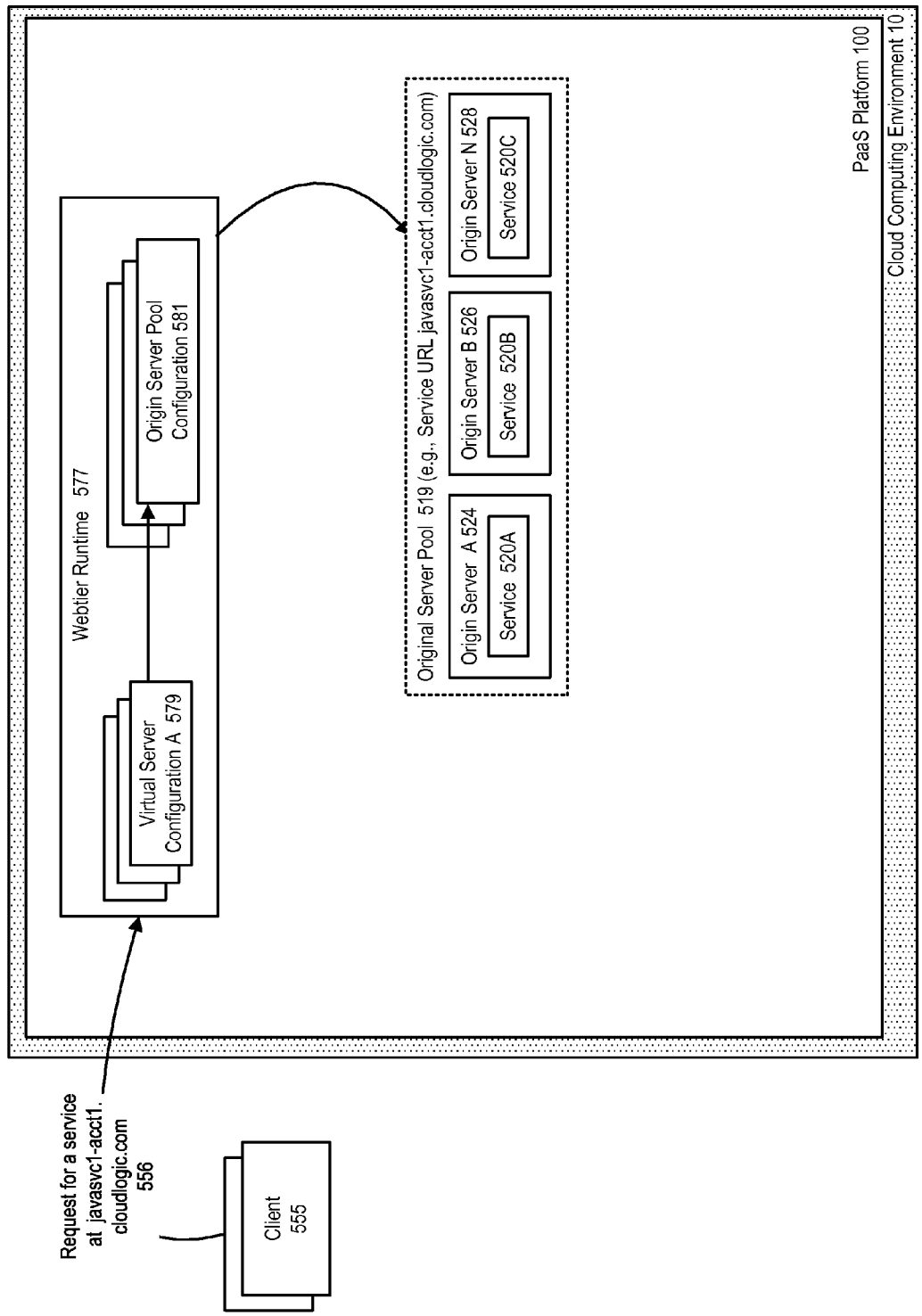
FIG. 17 further illustrates a system for associating services with a webtier runtime in a cloud platform environment, in accordance with an embodiment.

FIG. 17 further illustrates a system for associating services with a webtier runtime in a cloud platform environment, in accordance with an embodiment.

In accordance with an embodiment, when a request for the service from a client is received at the webtier runtime, the webtier runtime can route the request to a virtual server whose domain name matches the domain name of the service.

For example, as illustrated in FIG. 17, a client can request a service using a URL "javasvc1-acct1.cloudlogic.com", wherein the "javasvc1-acct1" portion of the URL is the domain name of the service given when the service was provisioned, and the "cloudlogic.com" is the base domain provided by the webtier provider. When receiving the request, the webtier runtime can route the request to the virtual server whose domain name matches that of the service.

In accordance with an embodiment, the virtual server configuration, in conjunction with the origin server configuration, can route the request to an appropriate service node in the origin server pool.

Certificate Generation

As described above, in accordance with an embodiment, the webtier provider SME can create a certificate matching the domain name of the service when the webtier runtime has an SSL port enabled. The default mechanism for certificate generation can be self-signed certificates. For example, the SME implementation can generate a self-signed certificate such that a common name in the certificate matches the service's domain name.

In accordance with an embodiment, certificates used in a private PaaS solution are internal to customers and can be transferred over the wire for certificate authority (CA) signed certificates in the cloud platform environment. In accordance with an embodiment, a wild card certificate can match any sub-domain based on its base domain name. For example, a wildcard SSL certificate for *.cloudlogic.com can match any sub-domain, such as dept1.cloudlogic.com, dept2.cloudlogic.com, etc.

In accordance with an embodiment, a cloud account administrator may want to use a specific signed certificate for their service, instead of wild-card certificate. In such situations, a signed service specific certificate, e.g., in PKCS#12 format, which packages both the certificate and a private key together in a single file, can be provided as part of association rules via a property.

Alternatively, a cloud account administrator can work in an offline manner with, for example an OTD system administrator, to install a signed service specific certificate in OTD; and specify, via a property, the name of the pre-installed certificate as part of an association rule. The webtier SME can ensure that a given service is tied to a specified certificate name.

Health Monitoring Configuration

In accordance with an embodiment, a health monitoring configuration can be generated per origin server pool. The health monitoring configuration can be used by a webtier runtime for failure detection on the origin server pool, and can be created either using the default values provided at the time of registration of the webtier runtime, or with values provided when creating a service type or a service.

End-to-End SSL

In accordance with an embodiment, the default behavior for the webtier runtime is to terminate SSL connections from a client at the webtier runtime, in which case the connection between the webtier runtime and service endpoints can be over non-SSL. However, some services may require connections between the webtier and service endpoints to be secured. In accordance with an embodiment, this can be achieved by enabling end-to-end SSL by the webtier provider. If end-to-end SSL is enabled, a service can be made available over an SSL port of the webtier runtime. Additionally, server certificates from the service can be installed in a trust-store of a runtime, e.g., Oracle Traffic Director (OTD), certificate database such that the traffic director trusts the certificate sent by service nodes when an SSL connection to them is initiated. An OTD client certificate can be installed in the trust store of the service nodes, such that these service nodes trust the client certificates presented to the server nodes when OTD initiates a connection to them.

Context-Root Matching

In accordance with an embodiment, the service administrator or end-user URL can specify a context-root, in which case the webtier provider SME can generate appropriate configurations such that requests matching the context-root can be forwarded to appropriate service nodes, while other requests are rejected by the webtier (e.g., OTD) runtime itself.

Maintenance Mode

In accordance with an embodiment, during service patching or upgrade, the service can enter a maintenance phase. When a service is in a maintenance phase, an appropriate error page is displayed to the end user; following completion of the maintenance phase, the service can be enabled again in the webtier (e.g., OTD). As services are updated, the corresponding changes can be made to the webtier runtime. As a service is stopped and terminated, the runtime can prevent access to the service, and can be used as a coordinator in applying rolling upgrades to a service.

In accordance with an embodiment, there can be two modes of maintenance: rolling upgrade/patching, and complete service shutdown.

In the rolling upgrade mode, a service can be upgraded or patched in a rolling fashion. Only one node is down at any given time so that the service can be accessible on the remaining nodes. Under this approach, a node under maintenance can be removed from an origin server pool and once the maintenance is completed and resumes operation, it can be added back to the origin server pool. The service SME can be implemented in such a way that a node under maintenance can be excluded from a list of URIs returned by APIs, e.g., getInternalEndUserURIs( ) and getInternalAdminURIs( ). The webtier provider SME can appropriately configure the origin server pool for a service based on the information returned by the APIs.

In the complete service shutdown mode of maintenance, if a service needs to be brought down completely from maintenance, then the webtier (e.g. OTD) runtime needs to be configured such that a "service under maintenance" page can be returned to users trying to access the service. Once the service maintenance phase is over, the runtime can be configured to resume normal operation for the service.

Vanity Domain Name

In accordance with an embodiment, a vanity domain name for a service can be provided at the time of service creation. For example, a name javasvc1.abc.com can be associated as a domain name to be used for service javasvc1. In such case, the webtier provider SME can generate configurations using javasvc1.abc.com as the domain name for the service, and bypass the default mechanism to auto-generate a domain name for the service.

Shared Versus Dedicated Providers

In accordance with an embodiment, the webtier provider can provide support for a shared tenancy model, wherein a single webtier runtime can be shared by multiple services. The implementation of the webtier provider SME can ensure that conflicts do not arise as a result of a webtier runtime being shared by multiple services. In cases where such conflicts cannot be resolved, the association can fail with appropriate errors.

Webtier Provider SME

In accordance with an embodiment, the webtier provider SME can provide an interface to handle association between the webtier provider and the service. As a result of the association or re-association, an association result object can be generated that includes a list of properties for the consumption of the service post-association. Example properties can include a webtier URL that exposes the service administration interface of the service, and a webtier URL that exposes the end user interface of the service.

Certificate Input File

In accordance with an embodiment, the webtier provider SME can provide support for certificate generation based on a domain name generated for a particular service. When a certificate is generated, there are certain inputs that are expected, which by default can be left blank except for common name, which can match the service's domain name. The webtier provider SME can provide an input file which contains inputs that can be used for the certificate generation. In accordance with an embodiment, this file can be provided either while creating a provider using lb-service-default-cert-input-file, or while creating a service type/service using lb-service-cert-input-file.

Association

In accordance with an embodiment, the service SDP can define dependency on a webbtier in its service definition (e.g., xml) file. The service can be associated with the webtier after the service is provisioned, so that endpoints for end users and service administrators can be exposed for them to access the service. Similarly, the service can be dissociated with the webtier pre-unprovisioning, so that the endpoints for end users and service administrators can be removed from the webtier before the service runtime is made unavailable. As described above, a service SDP can define dependency on the webtier in its service definition xml, an example of which is illustrated in Listing 4:

Listing 4

```
<service-definition>
    ...
    <dependencies>
        <provider name="SERVICE_WEBTIER_DEPENDENCY">
            <selection-criteria>
                <family>Webtier</family>
            </selection-criteria>
            <association-rules>
                <phase>post-provisioning</phase>
                <parameter name="service.healthcheckurl"
                           value="/foo"/>
                <parameter name="service.health-check-interval"
                           value="10"/>
                <parameter name="service.healthcheck-timeout"
                           value="30"/>
            </association-rules>
            <association-rules>
                <phase>pre-unprovisioning</phase>
            </association-rules>
        </provider>
    </dependencies>
    ...
</service-definition>
```

Re-Association

In accordance with an embodiment, a webtier provider type can support a change to its configurable set of properties when not in use. However any change to its configurable set of properties when it is in use will fail by throwing operation exceptions. In accordance with an embodiment, the webtier provider can support re-association for the following cases:

Service scaling operation: the origin server pool will be reconfigured to new set of serviceendpoints.

Service specific CA signed certificate: the service specific certificate will be installed in OTD certificate database.

Service maintenance operation: the service under maintenance will be removed from active operation and maintenance page will be displayed to end-users; after completion of maintenance phase, the service will resume normal operation.

Figure 18:
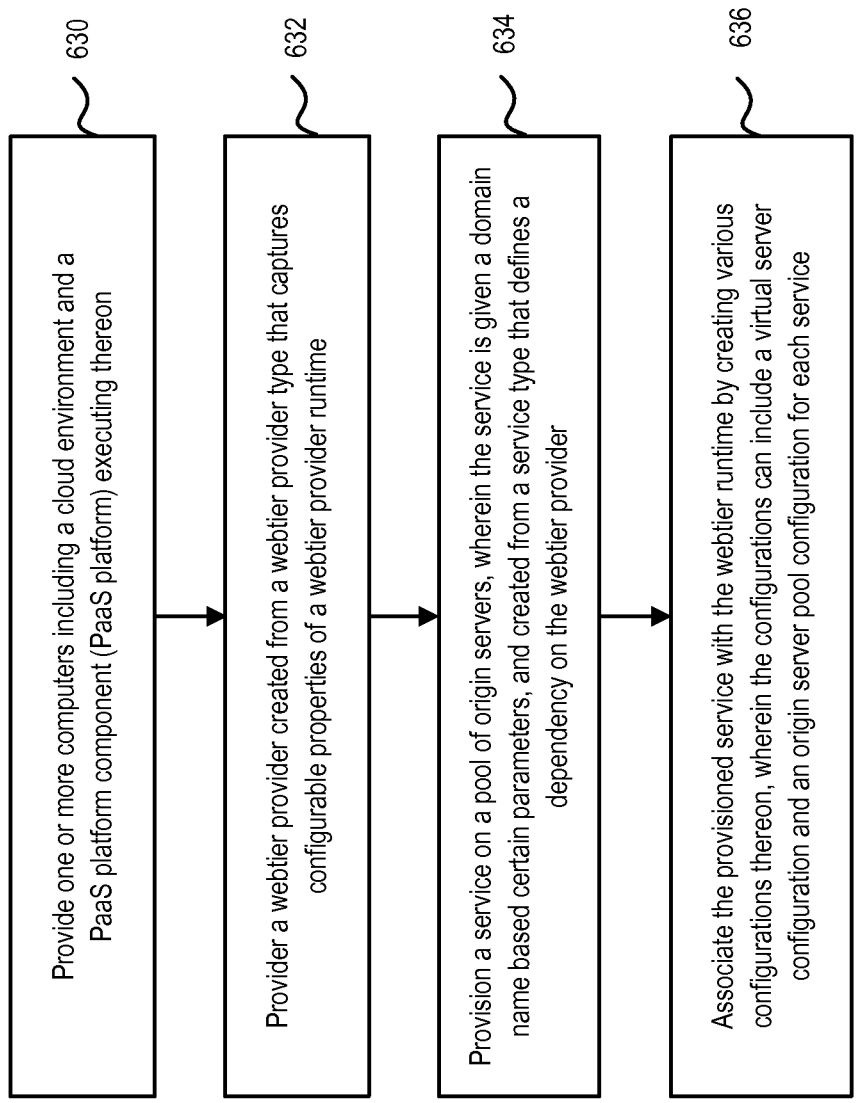
FIG. 18 illustrates a method for associating services with a webtier runtime in a cloud platform environment, in accordance with an embodiment.

FIG. 18 illustrates a method for associating services with a webtier runtime in a cloud platform environment, in accordance with an embodiment.

As shown in FIG. 18, in accordance with an embodiment, at step 630, one or more computers including a cloud environment and a PaaS platform component (PaaS platform) executing thereon, are provided.

At step 632, a webtier provider is provided, wherein the webtier provider is created from a webtier provider type that captures configurable properties of a webtier provider runtime.

At step 634, a service is created from a service type, provisioned on a pool of origin servers, and given a domain name based certain parameters, where the service type defines a dependency on the webtier provider.

At step 636, the provider SME associates the provisioned service with the webtier runtime by creating various configurations thereon. In accordance with an embodiment, the configurations can include a virtual server configuration and an origin server pool configuration for each service.

Figure 19:
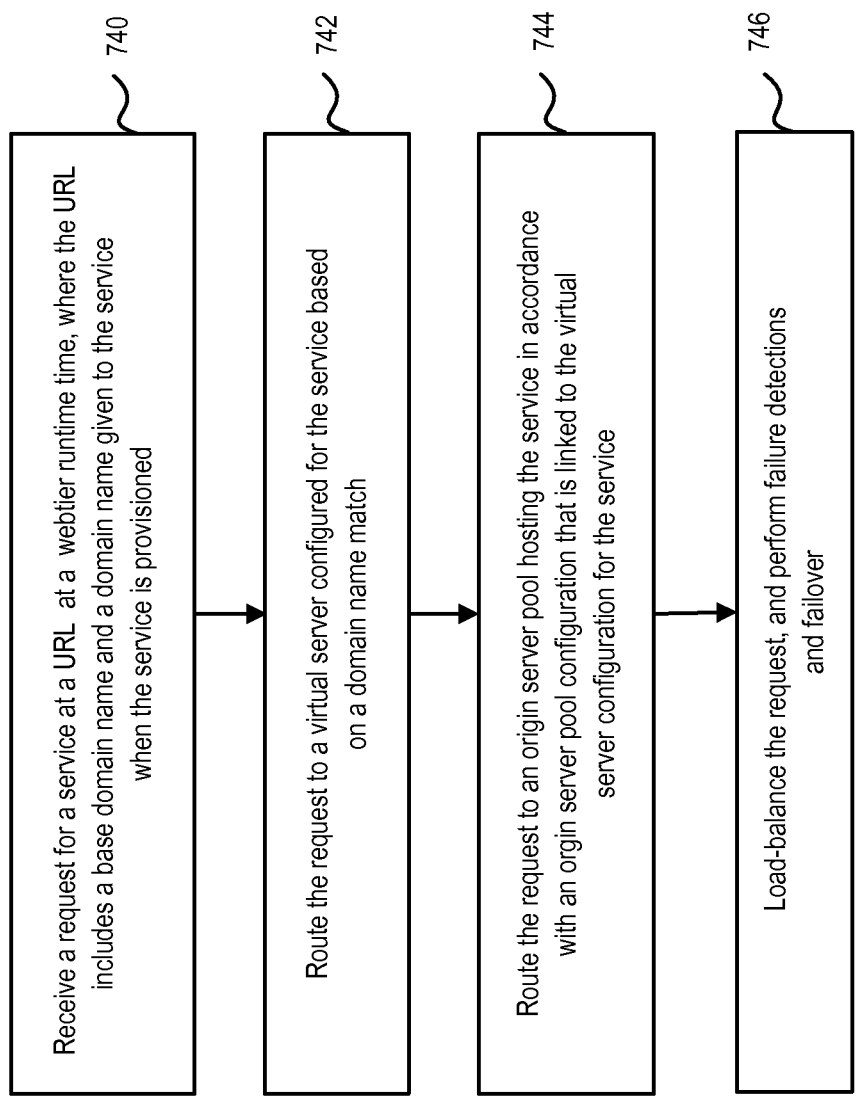
FIG. 19 illustrates a method for routing a service request to an origin server pool that hosts the service in a cloud platform environment, in accordance with an embodiment.

FIG. 19 illustrates a method for routing a service request to an origin server pool that hosts the service in a cloud platform environment, in accordance with an embodiment.

As shown in FIG. 19, in accordance with an embodiment, at step 740, a request for a service at a URL is received at a webtier runtime time, where the URL includes a base domain name and a domain name given to the service when the service is provisioned.

At step 742, the webtier runtime routes the request to a virtual server configured for the service based on a domain name match.

At step 744, the virtual server routes the requests to an origin server pool hosting the service in accordance with an origin server pool configuration linked to the virtual server configuration for the service.

At step 746, the webtier runtime can load balance the request, and perform failure detections and failovers.

Support for Oracle Traffic Director (OTD) Features

In accordance with an embodiment, certain features that are in-built into a product such as Oracle Traffic Director (OTD) can be made available as part of a webtier provider runtime, for example:

Session stickiness: the ability to maintain session stickiness based on cookie or url-rewriting mechanism. For example, OTD can detect session creation based on a configured cookie name (by default JSESSIONID). The requests belonging to a same session are routed to a same back-end instance.

Failure detection: use of a health check mechanism to detect failed as well as recovered instances. The healthy instances form an active list of instances which can be used to service requests.

Certificate configuration: support for configuring certificates at virtual server level. A certificate matching the virtual server can be presented to a client, if a client request matches that virtual server.

Proxy headers: the addition of proxy headers to the request before forwarding it to the back-end server to provide necessary information regarding the requests.

Illustrative Example—OTD

In accordance with an embodiment, an administrator can configure the system for use with an Oracle Traffic Director (OTD) webtier provider using the following process, to associate a service and the OTD webtier runtime, so that the OTD runtime can provide the functionalities as described above:

1. Set CPAS_HOME:
   export CPAS_HOME=YOUR_CPAS_INSTALLATION_DIRECTORY
2. Start the Domain:
   $CPAS_HOME/asadmin startdomain debug=true domain1
3. Create virtualizaton provider:
   $CPAS_HOME/nadmin createvirtualizationproviderphysical native
4. Create Account:
   $CPAS_HOME/cadmin createaccount a1
5. Create the environment:
   $CPAS_HOME/cadmin createenvironment account a1 e1
6. Load the Java-lite service SDP:
   $CPAS_HOME/asadmin loadsdp
   $PATH_TO_JAVA_LITE_SDP/javaliteservicenative.sdp
7. Create a service type:
   $CPAS_HOME/asadmin createservicetype sdp JavaServiceLite properties vasconfigname=native: assemblyname=glassfish:assemblyversion=1 JavaEEST
8. Load the webTier Provider SDP:
   $CPAS_HOME/asadmin loadsdp $PATH_TO_WEBTIER-PROVIDER_SDP/webtierotdprovider.sdp 9. Create a provider:
$CPAS_HOME/asadmin createprovider sdp OracleTrafficDirector properties lbservicesbasedomainname=<username>.cloudlogic.com:lbmachineipaddr=
10. Create Service:
$CPAS_HOME/cadmin createservice account a1 environment e1 servicetype JavaEEST myservice The association with the OTD runtime happens once the service (e.g., the Java service) is created. The association commands can be seen in the server log.

Illustrative Example—OHS

In accordance with an embodiment, an administrator can configure the system for use with an Oracle HTTP Server (OHS) webtier provider using the following process, to associate a service and the OHS webtier runtime, so that the OHS runtime can provide the functionalities as described above:

1. Set WLS-CPAS_HOME:
export WLSCPAS_HOME=YOUR_WLS_CPAS_INSTALLATION_DIRECTORY
2. Create virtualization provider:
$WLSCPAS_HOME/padmin—user admin—passwordfile <pathtopasswordfile> create-virtualization-provider-physical native
3. Create Account:
$WLSCPAS_HOME/padmin—user admin—passwordfile <pathtopasswordfile> create-account a1
4. Create the environment:
$WLSCPAS_HOME/cadmin—user admin—passwordfile <pathtopasswordfile> create-environment—account a1 e1
5. Load the Java-Service SDP:
$WLSCPAS_HOME/padmin—user admin—passwordfile <pathtopasswordfile> load-sdp <pathtojavaservice>/javaservicenative.sdp
6. Create a service type:
$WLSCPAS_HOME/padmin—user admin—passwordfile <pathtopasswordfile> create-service-type—sdp Java-Service JavaEEST
7. Load OHS provider SDP:
$WLSCPAS_HOME/padmin—user admin—passwordfile <pathtopasswordfile> load-sdp <pathtowebTiersdp>/webtierohsprovider.sdp
8. Create provider type:
$WLSCPAS_HOME/padmin—user admin—passwordfile <pathtopasswordfile> create-provider-type—SDP Oracle-HTTP-Server-properties . . .
9. Create service:
$WLSCPAS_HOME/cadmin—user admin—passwordfile <pathtopasswordfile> create-service—account a1—environment e1-servicetype JavaEEST
10. List services to see the LB urls:
$WLSCPAS_HOME/cadmin—user admin—passwordfile <pathtopasswordfile> list-services The association with the OHS runtime similarly happens once the service (e.g., the Java service) is created.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while several of the embodiments and examples described above describe the use of webtier providers in Oracle Traffic Director (OTD), or Oracle HTTP Server (OHS) environments, and with OTD and OHS runtimes, in accordance with various embodiments the system can support the use of different webtier providers and runtimes.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for managing identity store configurations in a platform as a service (PaaS) layer in a cloud environment, comprising:
    one or more computers including a cloud environment executing thereon;
    a software suite within the cloud environment that supports provisioning PaaS services, and includes a first service definition package (SDP), and a second SDP, wherein each SDP includes a service management engine (SME), and a virtual assembly that defines and configures a set of virtual appliances;
    a provider type derived from the first SDP for use in creating a provider service that stores and manages a plurality of identity store configurations, wherein each identity store configuration is associated with a different identity store;
    a service type derived from the second SDP for use in creating a PaaS service, wherein the service type specifies one of the plurality of identity store configurations as a dependency;
    wherein when the PaaS service is created from the service type and deployed on one or more virtual machines defined and configured by the virtual assembly, the SME in the second SDP operates to
        retrieve, from the provider service, the identity store configuration specified by the service type, and
        use the retrieved identity store configuration to configure the associated identity store for use by the PaaS service.

2. The system of claim 1, wherein the provider service supports validating credentials of a service administrator that are stored in an identity store to ensure that the PaaS service be managed by an appropriate user after the PaaS service is deployed.

3. The system of claim 1, where each of the plurality of identity store configurations is represented with a provider type entry in a domain configuration file.

4. The system of claim 1, wherein the plurality of identity store configurations include configurations for a plurality of lightweight directory access protocol (LDAP) servers including an Oracle Internet Directory (OID), an Active Directory (AD), and an OpenLDAP server.

5. The system of claim 1, wherein the first SDP includes custom code configured to manage a runtime of the provider service, and the second SDP includes custom code configured to manage a runtime of the PaaS service.

6. The system of claim 1, wherein the software suite within the cloud environment is an installable PaaS platform component.

7. The system of claim 1, wherein the SME in the second SDP implements an association handler object interface, and retrieves the identity store configuration specified by the service type from the provider service using the association result object from the provider service.

8. A method of managing identity store configurations in a platform as a service (PaaS) layer in a cloud environment, comprising:
    providing, at one or more computers including a cloud environment executing thereon, a software suite within the cloud environment that supports provisioning PaaS services, and includes a first service definition package (SDP), and a second SDP, wherein each SDP includes a service management engine (SME),and a virtual assembly that defines and configures a set of virtual appliances;
    deriving a provider type from the first SDP for use in creating a provider service that stores and manages a plurality of identity store configurations, wherein each identity store configuration is associated with a different identity store;
    deriving a service type from the second SDP for use in creating a PaaS service, wherein the service type specifies one of the plurality of identity store configurations as a dependency;
    deploying the PaaS service created from the service type on one or more virtual machines defined and configured by the virtual assembly;
    retrieving, using the SME in the second SDP, the identity store configuration specified by the service type from the provider service; and
    using the retrieved identity store configuration to configure the associated identity store for use by the PaaS service.

9. The method of claim 8, wherein the provider service supports validating credentials of a service administrator that are stored in an identity store to ensure that the PaaS service be managed by an appropriate user after the PaaS service is deployed.

10. The method of claim 8, where each of the plurality of identity store configurations is represented with a provider type entry in a domain configuration file.

11. The method of claim 8, wherein the plurality of identity store configurations include configurations for a plurality of lightweight directory access protocol (LDAP) servers including an Oracle Internet Directory (OID), an Active Directory (AD), and an OpenLDAP server.

12. The method of claim 8, wherein the first SDP includes custom code configured to manage a runtime of the provider service, and the second SDP includes custom code configured to manage a runtime of the PaaS service.

13. The method of claim 8, wherein the software suite within the cloud environment is an installable PaaS platform component.

14. The method of claim 8, wherein the SME in the second SDP implements an association handler object interface, and retrieves the identity store configuration specified by the service type from the provider service using the association result object from the provider service.

15. A non-transitory computer readable storage medium, including instructions stored thereon which when read and executed by one or more computers cause the one or more computers to perform the steps comprising:
    providing, at one or more computers including a cloud environment executing thereon, a software suite within the cloud environment that supports provisioning PaaS services, and includes a first service definition package (SDP), and a second SDP, wherein each SDP includes a service management engine (SME),and a virtual assembly that defines and configures a set of virtual appliances;
    deriving a provider type from the first SDP for use in creating a provider service that stores and manages a plurality of identity store configurations, wherein each identity store configuration is associated with a different identity store;
    deriving a service type from the second SDP for use in creating a PaaS service, wherein the service type specifies one of the plurality of identity store configurations as a dependency;
    deploying the PaaS service created from the service type on one or more virtual machines defined and configured by the virtual assembly;
    retrieving, using the SME in the second SDP, the identity store configuration specified by the service type from the provider service; and
    using the retrieved identity store configuration to configure the associated identity store for use by the PaaS service.

16. The non-transitory computer readable storage medium of claim 15, wherein the provider service supports validating credentials of a service administrator that are stored in an identity store to ensure that the PaaS service be managed by an appropriate user after the PaaS service is deployed.

17. The non-transitory computer readable storage medium of claim 15, where each of the plurality of identity store configurations is represented with a provider type entry in a domain configuration file.

18. The non-transitory computer readable storage medium of claim 15, wherein the plurality of identity store configurations include configurations for a plurality of lightweight directory access protocol (LDAP) servers including an Oracle Internet Directory (OID), an Active Directory (AD), and an OpenLDAP server.

19. The non-transitory computer readable storage medium of claim 15, wherein the first SDP includes custom code configured to manage a runtime of the provider service, and the second SDP includes custom code configured to manage a runtime of the PaaS service.

20. The non-transitory computer readable storage medium of claim 15, wherein the software suite within the cloud environment is an installable PaaS platform component.

* * * * *

UNITED STATES PATENT AND TRADEMARK OFFICE
CERTIFICATE OF CORRECTION

PATENT NO. : 9,847,905 B2
APPLICATION NO. : 14/478987
DATED : December 19, 2017
INVENTOR(S) : Perez et al.

Page 1 of 1

It is certified that error appears in the above-identified patent and that said Letters Patent is hereby corrected as shown below:

In the Drawings

On sheet 13 of 19, in FIGURE 13, under Reference Numeral 434, Line 2, delete "configurarions" and insert -- configurations --, therefor.

On sheet 16 of 19, in FIGURE 16, under Reference Numeral 576, Line 3, delete "orgin" and insert -- origin --, therefor.

On sheet 19 of 19, in FIGURE 19, under Reference Numeral 744, Line 2, delete "orgin" and insert -- origin --, therefor.

In the Specification

In Column 2, Line 27, after "embodiment" insert -- . --.

In Column 24, Line 57, delete "webbtier" and insert -- webtier --, therefor.

In the Claims

In Column 29, Line 29, in Claim 8, delete "(SME),and" and insert -- (SME), and --, therefor.

In Column 30, Line 20, in Claim 15, delete "(SME),and" and insert -- (SME), and --, therefor.

Signed and Sealed this
Twenty-fourth Day of July, 2018

Andrei Iancu
*Director of the United States Patent and Trademark Office*